(12) United States Patent
Cabrera Castillo

(10) Patent No.: US 12,505,735 B2
(45) Date of Patent: Dec. 23, 2025

(54) ACTIVE QUEUE MANAGEMENT SYSTEM

(71) Applicant: Smart Border Sytems, Inc., San Diego, CA (US)

(72) Inventor: Luis Eduardo Cabrera Castillo, Mexico City (MX)

(73) Assignee: Smart Border Systems, Inc., San Diego, CA (US)

( * ) Notice: Subject to any disclaimer, the term of this patent is extended or adjusted under 35 U.S.C. 154(b) by 0 days.

(21) Appl. No.: 18/584,187

(22) Filed: Feb. 22, 2024

(65) Prior Publication Data

US 2024/0304084 A1 Sep. 12, 2024

Related U.S. Application Data

(60) Provisional application No. 63/450,087, filed on Mar. 6, 2023.

(51) Int. Cl.
| | |
|---|---|
| *G07B 15/06* | (2011.01) |
| *G01C 21/26* | (2006.01) |
| *G01C 21/34* | (2006.01) |
| *G07C 9/15* | (2020.01) |
| *G08G 1/01* | (2006.01) |
| *G08G 1/065* | (2006.01) |

(Continued)

(52) U.S. Cl.
CPC ............ *G08G 1/0145* (2013.01); *G07C 9/15* (2020.01); *G08G 1/0133* (2013.01); *G06V 20/54* (2022.01)

(58) Field of Classification Search
None
See application file for complete search history.

(56) References Cited

U.S. PATENT DOCUMENTS

2007/0244627 A1 10/2007 Boss et al.
2008/0300776 A1* 12/2008 Petrisor .................. G08G 1/017
701/118

(Continued)

FOREIGN PATENT DOCUMENTS

JP 2016134003 A * 7/2016
WO WO-2010058058 A1 * 5/2010 ........... G08G 1/0104

OTHER PUBLICATIONS

See Espacenet Translation for JP-2016134003-A, Okawa, 2016, pp. 1-15 (Year: 2016).*

(Continued)

*Primary Examiner* — Angela Y Ortiz
*Assistant Examiner* — Michael T Silva
(74) *Attorney, Agent, or Firm* — John M. Rogitz

(57) ABSTRACT

In one aspect, an electronic active queue management system (AQMS) may be used to identify processing capacity of entry points and quantifiable amounts of congestion at a land port of entry (LPOE) based on one or more real-time measurements of traffic flow. Based on the amount(s) of congestion, the AQMS may dynamically manage arrival times at the LPOE through one or more lanes of the LPOE, controlling wait times in the queue system. As part of managing arrival times at the LPOE, the AQMS can schedule arrival times for vehicles and/or people at the dedicated lane of the LPOE. The arrivals may be scheduled through a dedicated AQMS app, through a web-based interface, and/or through telephone text messaging. Present principles may also be used for queue management at airports, concerts, sporting events, etc.

21 Claims, 34 Drawing Sheets

(51) Int. Cl.
    *G08G 1/0967*    (2006.01)
    *G06V 20/54*     (2022.01)

(56) References Cited

U.S. PATENT DOCUMENTS

| | | |
|---|---|---|
| 2010/0231415 A1 | 9/2010 | Roberts |
| 2017/0270734 A1 | 9/2017 | Geraghty et al. |
| 2018/0180423 A1 | 6/2018 | Baverstock et al. |
| 2019/0257045 A1* | 8/2019 | Bock, II ............... E01F 13/123 |
| 2020/0111034 A1 | 4/2020 | Sahadi |
| 2020/0356786 A1* | 11/2020 | Hannah .................. G08G 1/017 |
| 2020/0394584 A1 | 12/2020 | Walsh et al. |
| 2021/0118294 A1 | 4/2021 | Ran et al. |
| 2021/0304520 A1* | 9/2021 | Hori ................... G01C 21/3461 |
| 2022/0223038 A1* | 7/2022 | Chikamori ....... G08G 1/096775 |
| 2023/0194295 A1* | 6/2023 | Nayak .................. G06V 20/588 |
| | | 701/118 |

OTHER PUBLICATIONS

See Espacenet Translation of WO-2010058058-A1, Sikander, 2010, pp. 1-17 (Year: 2010).*

"International Search Report and Written Opinion", dated Jun. 10, 2024, from the counterpart PCT application PCT/US24/17733.

* cited by examiner

*1401*

Be Smart, Be PLUS

Smart Border Systems
Capacity Optimizations

Choose Appointment     Your Info     Confirmation

Returning? Login

Ready Lane PLUS

| | Arrival Window 20 Minutes | Book *1402* |

SENTRI/Global Entry PLUS

| | Arrival Window 20 Minutes | Book *1403* |

FIG. 14A

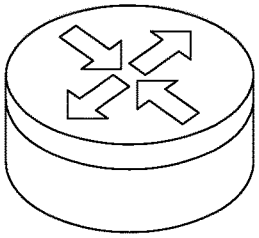
1401
Be Smart, Be PLUS
Smart Border Systems
Capacity Optimizations
~1404
Choose Appointment    Your Info    Confirmation
Returning? Login
« View All Appointments
    Arrival Window
20 Minutes
With...
| Any available | Select |
|---|---|
| | 1406 |
Otay Mesa
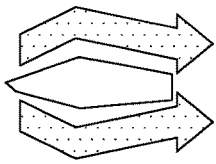 SMARTLane - Otay Mesa    Select
Arrival Window
20 Minutes    1407
San Ysidro POE
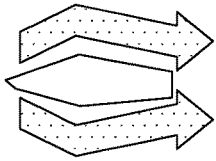 SMARTLane - San Ysidro    Select
Arrival Window
20 Minutes    1408
FIG. 14B

2101

/ 2100

Nueva cita: Arrival Window (JOHN Smith) el Monday, October 30,2023 08:00 con SMARTlane #1

SMARTlane powered by SBS <scheduling@acuityscheduling.com>
Reply To: SMARTlane powered by SBS <ec@smartborder.systems> — 2105
To: johnSmith@email.com

2115 / 2110

Appointment Scheduled for JOHN Smith — 2115

What    Arrival Window (SMARTlane) — 2120

2125 — What    Monday, October 30,2023 08:00 (20 minutes)

What    SAN Ysidro POE — 2130

Thank you, Your Appointment Has Been Successfully Scheduled. — 2135

| Change/Cancel Appointment | — 2140 |
| Add to iCal/Outlook Calender | — 2145 |
| Add to Google Calender | — 2150 |

 Appointment.ics — 2155
1k

FIG. 21

ACTIVE QUEUE MANAGEMENT SYSTEM

FIELD

The disclosure below relates to technically inventive, non-routine solutions that are necessarily rooted in computer technology and that produce concrete technical improvements In particular, the disclosure below relates to electronic active queue management systems (AQMSs) such as those for random and independent arrivals distribution of vehicles approaching entry points.

BACKGROUND

Ports and other facilities concentrate traffic demands and congestion, which can happen periodically until further expansions or modernizations materialize, and in the meantime transportation infrastructure operators manage congestion with different levels of technification. For example, once mankind achieved commercial aviation, air traffic controllers were introduced and have become more sophisticated as time goes on. Indeed, airports and seaports have recognized the need of approaching systems managing capacity of runways, berthings, and other facilities in a prudent manner.

However, present principles recognize that the current levels of technification leave much to be desired in terms of vehicle and people queue management in busy and constrained facilities. Electronic management systems either do not exist or are too confusing and unnecessarily complex to be used effectively. The creation of new user categories which expedite access are subject to the same physical constraints, and therefore congestion can happen eventually again even for these new categories. Being inefficient, these systems and/or user categorizations also consume an undue amount of electronic/system resources. No adequate solutions currently exist for the foregoing problems.

SUMMARY

Accordingly, in one aspect an apparatus includes a processor assembly and storage accessible to the processor assembly. The storage includes instructions executable by the processor assembly to transmit a first notification to a first device, where the first notification indicates a first time at which a first user of the first device is to queue for a port of entry. The instructions are also executable to receive input from a sensor monitoring lane traffic for at least a first entry lane at the port of entry and, based on the input, determine a second time at which a second user of a second device is to queue for the port of entry. The instructions are also executable to, based on the determination of the second time, transmit a second notification to the second device. The second notification indicates a second time at which the second user is to queue for the port of entry.

In various examples, the apparatus may include a server, the first device, and/or the second device. Also in various examples, the sensor may include a camera, a radar system, and/or a radio frequency identification (RFID) sensor.

In certain example implementations, the instructions may also be executable to execute one or more functions to maintain at least a threshold number of vehicles in a queue of the first entry lane, where the threshold number is greater than one. The instructions may be further executable to execute one or more functions to keep the queue for the first entry lane from exceeding a target maximum number of vehicles for the queue of the first entry lane, where the target maximum number of vehicles may be different from and greater than the threshold number of vehicles.

Also in some example implementations, the instructions may be executable to present the first notification at the first device by controlling a first instance of an application (app) executing at the first device, and to present the second notification at the second device by controlling a second instance of the app executing at the second device.

In another aspect, a method includes executing an electronic active queue management system (AQMS). The method also includes receiving input from a sensor monitoring lane traffic for one or more entry lanes at a port of entry and, based on the input, determining a time at which a user of a device is to arrive at the port of entry. The method further includes, based on the determining of the time, transmitting a notification to the device. The notification indicates a time at which the user is to arrive at the port of entry.

In various examples, the notification may indicate a particular lane from amongst plural lanes at the port of entry, where the particular lane is a lane at which the user is to arrive.

If desired, in some cases the method may include presenting the notification at the device by controlling a first instance of an application (app) executing at the device.

Also in some example instances, the method may include using the input from the sensor to identify a flow rate of traffic through the one or more entry lanes and using the flow rate to determine the time at which the user is to arrive at the port of entry.

In some examples, the method may also include receiving a user identifier at a first entry point to a first lane of the one or more entry lanes and determining, based on the user identifier, that the user has been authorized to enter the first lane. Here the method may then include, based on determining that the user has been authorized to enter the first lane, sending a control command to a barrier to permit entry to the first lane through the first entry point. The identifier may be received in the form of an identifier transmitted by a transponder associated with the user, and/or a passcode entered by the user using a keypad at the first entry point. Additionally or alternatively, the identifier may be received via a radio frequency identification (RFID) signal receiver.

In still another aspect, an apparatus includes at least one computer readable storage medium (CRSM) that is not a transitory signal. The at least one CRSM includes instructions executable by a processor assembly to execute an electronic active queue management system (AQMS) and to, as part of executing the AQMS, identify an amount of congestion at a land port of entry (LPOE) based on one or more real-time measurements of traffic flow. The instructions are also executable to, based on the amount of congestion, dynamically manage arrival times at the LPOE through a dedicated lane of the LPOE. The instructions are further executable to, as part of managing arrival times at the LPOE, schedule an arrival time for a personal vehicle at the dedicated lane of the LPOE.

In some examples, the one or more real-time measurements of traffic flow may be received from one or more radio frequency identification (RFID) elements.

Also in some examples, the instructions may be executable to control a boom barrier to permit the personal vehicle to enter the dedicated lane.

Additionally, if desired the apparatus may include a server, and the server may include the processor assembly.

The details of the present application, both as to its structure and operation, can be best understood in reference

BRIEF DESCRIPTION OF THE DRAWINGS

FIG. 21 shows an example GUI confirming an arrival booked through the AQMS consistent with present principles;

DETAILED DESCRIPTION

Figure 1:
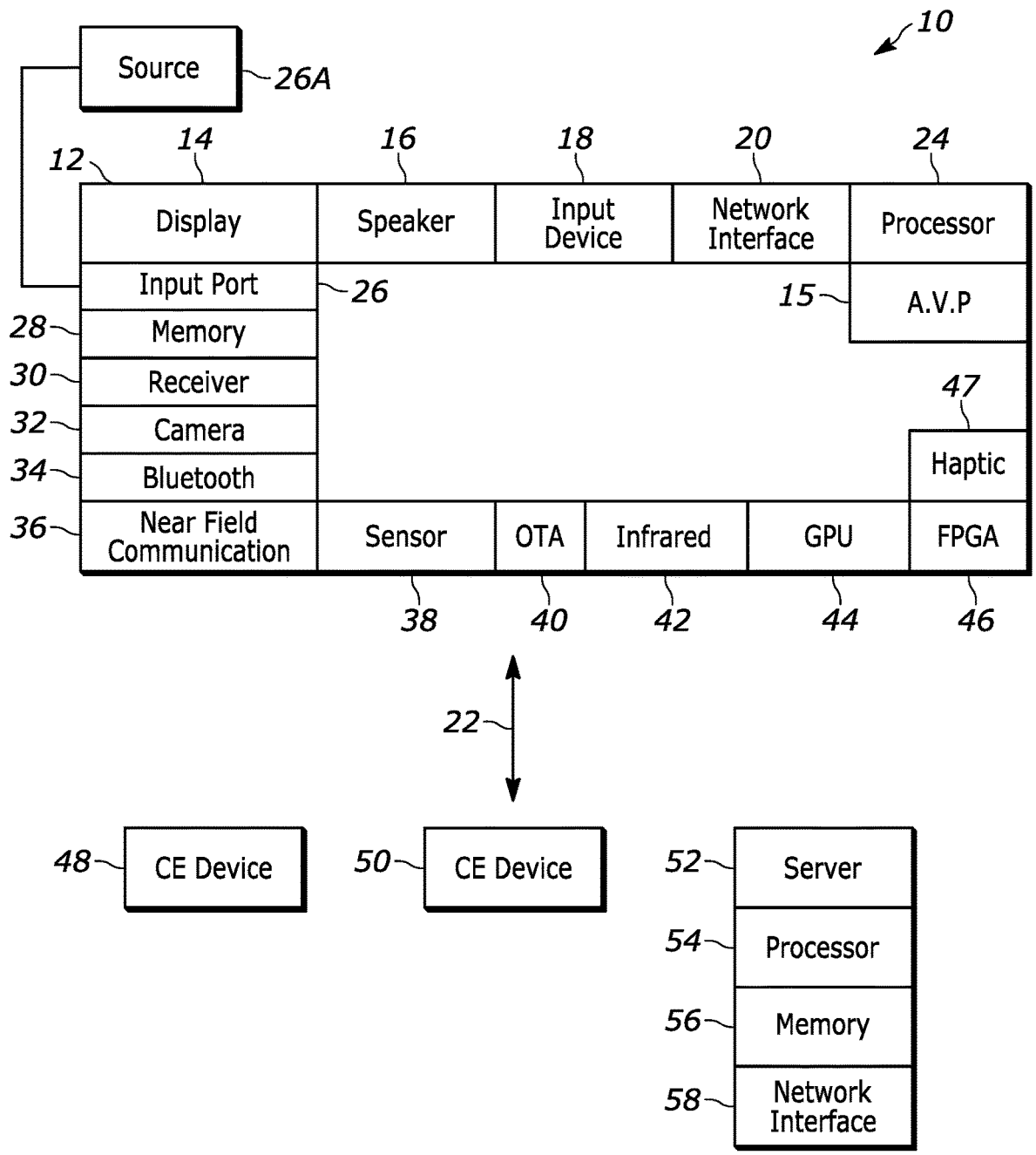
FIG. 1 is a block diagram of an example system consistent with present principles.

This disclosure relates generally to aspects of consumer electronics (CE) devices and other types of client devices and servers. Thus, devices herein may include server and client components which may be connected over a network such that data may be exchanged between the client and server components. The client components may include one or more computing devices including mobile smart phones and other mobile devices, wearable devices, game consoles, extended reality (XR) headsets such as virtual reality (VR) headsets and augmented reality (AR) headsets, display devices such as televisions (e.g., smart TVs, Internet-enabled TVs), personal computers such as laptops, desktop, and tablet computers, and still other types of devices. These client devices may operate with a variety of operating environments. For example, a client device consistent with present principles may employ, as examples, Linux and Unix operating systems, operating systems from Microsoft, or operating systems from Apple or Google. These operating environments may be used to execute one or more browsing programs, such as a browser made by Microsoft, Apple, Google, or Mozilla. The operating environments may also be used to execute other Internet-networked dedicated mobile applications that can access websites hosted by the Internet servers over a network such as the Internet, a local intranet, or a virtual private network.

Servers and/or gateways may be used that may include one or more processors executing instructions that configure the servers to receive and transmit data over a network such as the Internet. Or a client and server can be connected over a local intranet or a virtual private network. A server or controller may be instantiated by a personal computer, mobile device, rack or blade server, etc.

As indicated above, information may be exchanged over a network between client devices and servers. To this end and for security, servers and/or clients can include firewalls, load balancers, temporary storages, and proxies, and other network infrastructure for reliability and security.

As used herein, instructions may refer to computer-implemented steps for processing information in the system. Instructions can be implemented in software, firmware or hardware, or combinations thereof and include any type of programmed steps undertaken by components of the system.

A processor may be any single- or multi-chip processor that can execute logic by means of various lines such as address lines, data lines, and control lines and registers and shift registers. Moreover, any logical blocks, modules, and circuits described below can be implemented or performed with a processor/processor assembly such as a central processing unit (CPU), a digital signal processor (DSP), a field programmable gate array (FPGA) or other programmable logic device, an application specific integrated circuit (ASIC), discrete gate or transistor logic, discrete hardware components, or any combination thereof designed to perform the functions described herein. A processor can be implemented by a controller or state machine or a combination of computing devices.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

The functions and methods described below, when implemented in software, can be written in an appropriate language such as but not limited to C# or C++, and can be stored on or transmitted from a computer-readable storage medium such as a hard disk drive (HDD) or solid state drive (SSD), random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

In an example, a processor/processor assembly can access information over its input lines from data storage, such as a computer readable storage medium as referenced above, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device, etc.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

The term "a" or "an" in reference to an entity refers to one or more of that entity. As such, the terms "a" or "an", "one or more", and "at least one" can be used interchangeably herein.

The term "circuit" or "circuitry" may be used in the summary, description, and/or claims. The term "circuitry" includes all levels of available integration, e.g., from discrete logic circuits to the highest level of circuit integration such as VLSI, and includes programmable logic components programmed to perform the functions of an embodiment as well as processors (e.g., special-purpose processors) programmed with instructions to perform those functions.

Note that present principles may also employ machine learning models, including deep learning models. Machine learning models use various algorithms trained in ways that include supervised learning, unsupervised learning, semi-supervised learning, reinforcement learning, feature learning, self learning, and other forms of learning. Examples of such algorithms, which can be implemented by computer circuitry, include one or more neural networks, such as one or more convolutional neural networks (CNNs) and/or one or more recurrent neural networks (RNNs) (such as a type of RNN known as a long short-term memory (LSTM) network). Support vector machines (SVM) and Bayesian networks also may be considered to be examples of machine learning models.

As understood herein, performing machine learning involves accessing and then training a model on training data to enable the model to process further data to make predictions. A neural network may include an input layer, an output layer, and multiple hidden layers in between that are configured and weighted to make inferences about an appropriate output.

Referring now to FIG. 1, an example system 10 is shown, which may include one or more of the example devices mentioned above and described further below in accordance with present principles. The first of the example devices included in the system 10 is a consumer electronics (CE) device 12. The CE device 12 may be a computerized Internet enabled ("smart") phone, a tablet computer, a laptop/notebook computer, a desktop computer, a head-mounted device (HMD) and/or headset such as smart glasses or AR or VR headset, another wearable computerized device, etc. Regardless, it is to be understood that the CE device 12 is configured to undertake present principles (e.g., communicate with other CE devices and servers to undertake present principles, execute the logic described herein, and perform other functions and/or operations described herein).

Accordingly, to undertake such principles the CE device 12 can be established by some, or all, of the components shown. For example, the CE device 12 can include one or more touch-enabled displays 14 that may be implemented by a high definition or ultra-high definition "4K" or higher flat screens. The touch-enabled display(s) 14 may include, for example, a capacitive or resistive touch sensing layer with a grid of electrodes for touch sensing consistent with present principles (e.g., to provide input to the GUIs discussed below).

The CE device 12 may also include an analog audio output port 15 to drive one or more external speakers or headphones, and may include one or more internal speakers 16 for outputting audio in accordance with present principles, and at least one additional input device 18 such as an audio receiver/microphone, e.g., for conversing telephonically or for entering audible commands to the CE device 12 to control the CE device 12. The example CE device 12 may also include one or more wired or wireless network interfaces 20 for communication over at least one network 22 such as the Internet, a WAN, a LAN, etc. under control of one or more processors of a processor assembly 24, such as a CPU or other processor mentioned above. Thus, the interface 20 may be, without limitation, a Wi-Fi transceiver and/or wireless telephony transceiver for communicating over a wireless cellular network (e.g., operated by Verizon, T-Mobile, or AT&T), both of which are examples of a wireless computer network interface.

It is to be understood that the processor assembly 24 may include one or more processors acting independently or in concert with each other to execute an algorithm, whether those processors are in one device or more than one device. The processor assembly 24 controls the CE device 12 to undertake present principles, including the other elements of the CE device 12 described herein such as controlling the display 14 to present images thereon and receiving input therefrom. Furthermore, also note the network interface 20 may be a wired or wireless modem or router or other suitable network interface.

In addition to the foregoing, the CE device 12 may also include one or more input and/or output ports 26 such as a high-definition multimedia interface (HDMI) port or a universal serial bus (USB) port to physically connect to another CE device, and/or a headphone port to connect headphones to the CE device 12 for presentation of audio from the CE device 12 to a user through the headphones. For example, the input port 26 may be connected wired or wirelessly to a cable or satellite source 26a of audio video content. Thus, the source 26a may be a separate or integrated set top box, or a satellite receiver. Or the source 26a may be a game console or disk player containing content.

The CE device 12 may further include one or more non-transitory computer memories/computer-readable storage media 28 such as disk-based or solid-state storage that are not transitory signals, in some cases embodied in the chassis/housing of the CE device 12 (e.g., as standalone devices) or as removable memory media or the below-described server(s). Also, in some embodiments, the CE device 12 can include a position or location receiver such as but not limited to a cell phone transceiver, global positioning system (GPS) transceiver, and/or altimeter 30. This transceiver may therefore be configured to receive geographic position information from a satellite or cellphone base station (and/or determine an altitude at which the CE device 12 is disposed) and then provide the information to the processor assembly 24. However, it is to be understood that another suitable position receiver other than a GPS receiver, cell phone transceiver, and/or altimeter may be used consistent with present principles to determine the location of the CE device 12.

Continuing the description of the CE device 12, in some embodiments the CE device 12 may include one or more cameras 32 that may be thermal imaging cameras, digital cameras such as webcams, infrared (IR) sensors, and/or other types of cameras or other optical sensors integrated into the CE device 12 and controllable by the processor assembly 24 to gather pictures/images and/or video consistent with present principles. Also included on the CE device 12 may be a Bluetooth® transceiver 34 and/or other Near Field Communication (NFC) element 36 for communication with other devices using respective Bluetooth and/or NFC wireless technologies/communication standards. An example NFC element can be a radio frequency identification (RFID) element.

Further still, the CE device 12 may include one or more auxiliary sensors 38 that provide input to the processor assembly 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc.

Other sensor examples include a motion sensor such as an accelerometer, gyroscope, magnetometer, a speed and/or cadence sensor, an event-based sensor, a gesture sensor (e.g., for sensing gesture command), etc. In one specific example, the sensor 38 thus may be implemented as an inertial measurement unit (IMU) with motion sensors including individual accelerometers, gyroscopes, and magnetometers, and/or other components of that include a combination of accelerometers, gyroscopes, and magnetometers, to determine the location and orientation of the CE device 12 in three dimensions. A gyroscope consistent with present principles may sense and/or measure the orientation of the CE device 12 and provide related input to the processor assembly 24, an accelerometer consistent with present principles may sense acceleration and/or movement of the CE device 12 and provide related input to the processor assembly 24, and a magnetometer consistent with present principles may sense and/or measure directional movement of the CE device 12 and provide related input to the processor 122.

The CE device 12 may also include an over-the-air TV broadcast port 40 for receiving OTA TV broadcasts and providing the input to the processor assembly 24. In addition to the foregoing, it is noted that the CE device 12 may also include an IR transceiver 42 such as an IR data association (IRDA) device. A battery (not shown) may be provided for powering the CE device 12, as may a kinetic energy harvester that may turn kinetic energy into power to charge the battery and/or power the CE device 12. A graphics processing unit (GPU) 44 and field programmable gated array 46 also may be included.

One or more haptics/vibration generators 47 may also be provided for generating tactile signals/vibrations that can be sensed by a person holding or in contact with the device. The haptics generators 47 may thus vibrate all or part of the CE device 12 using an electric motor connected to an off-center and/or off-balanced weight via the motor's rotatable shaft so that the shaft may rotate under control of the motor (which in turn may be controlled by a processor such as the processor assembly 24) to create vibration of various frequencies and/or amplitudes as well as force simulations in various directions.

In addition to the CE device 12, the system 10 may include one or more other CE devices/types, which may include some or all of the components mentioned above in relation to the CE device 12. In one example, a second CE device 48 may be established by an Internet of things (IoT) device, a smartphone, a laptop computer, etc. A third CE device 50 is also shown in FIG. 1 and may include similar components as the other CE devices. Thus, in one example, the CE device 50 may be configured as a head-mounted display (HMD) that may include a heads-up transparent or non-transparent display for respectively presenting extended reality (XR) content such as AR content, VR, content, and/or mixed reality (MR) content. The XR content itself might include, as an example, one or more of the GUIs described below, presented stereoscopically. The HMD may be configured as a glasses-type display, or as goggle-type and/or VR-type display vended by various computer hardware manufacturers such as Apple, Oculus, Meta, etc.

In the example shown, only three CE devices are shown, it being understood that fewer or more devices may be used. A device herein may implement some or all of the components shown for the CE device 12. Any of the components shown in the following figures may incorporate some or all of the components shown in the case of the CE device 12.

Now in reference to the afore-mentioned at least one server 52, it includes at least one server processor 54 and at least one tangible computer readable storage medium 56 such as disk-based or solid-state storage. The server 52 also includes at least one network interface 58 that, under control of the server processor 54, allows for communication with other illustrated devices over the network 22 (e.g., the Internet), and indeed may facilitate communication between the server 52 and any other servers/client devices as described herein. Note that the network interface 58 may be, e.g., a wired or wireless modem or router, Wi-Fi or Ethernet transceiver, or other appropriate interface such as, e.g., a wireless telephony transceiver.

Accordingly, in some embodiments the server 52 may be an Internet server or an entire server "farm" of multiple services. If desired, the server 52 may include/perform "cloud" functions such that the devices of the system 10 may access a "cloud" environment via the server 52 in certain example embodiments. Additionally or alternatively, the server 52 may be implemented by one or more computers in the same room as the other devices shown, or nearby.

The components shown in the following figures may include some or all components shown herein. Any user interfaces (UI) described herein may be consolidated and/or expanded, and UI elements may be mixed and matched between UIs.

With the foregoing in mind, disclosed herein are vehicle batch-makers for customs at land ports as well as other queue types. Thus, it is to be understood that an active queue management system (AQMS) consistent with present principles may be used to improve the technical systems that are currently employed at cross-border land ports of entry (LPOEs), alleviating processing capacity constraints and working as a dynamic arrivals batch-maker. Therefore, AQMS systems consistent with present principles emphasize capacity optimization of border infrastructure and the travel experience itself.

By controlling arrival demand for lanes prior to arrival at LPOEs, AQMS may thus create an electronic commute funnel to improve not just the technical systems used by government agencies as well as their reliability, but also to improve wait times and overall queue performance control.

Figure 2:
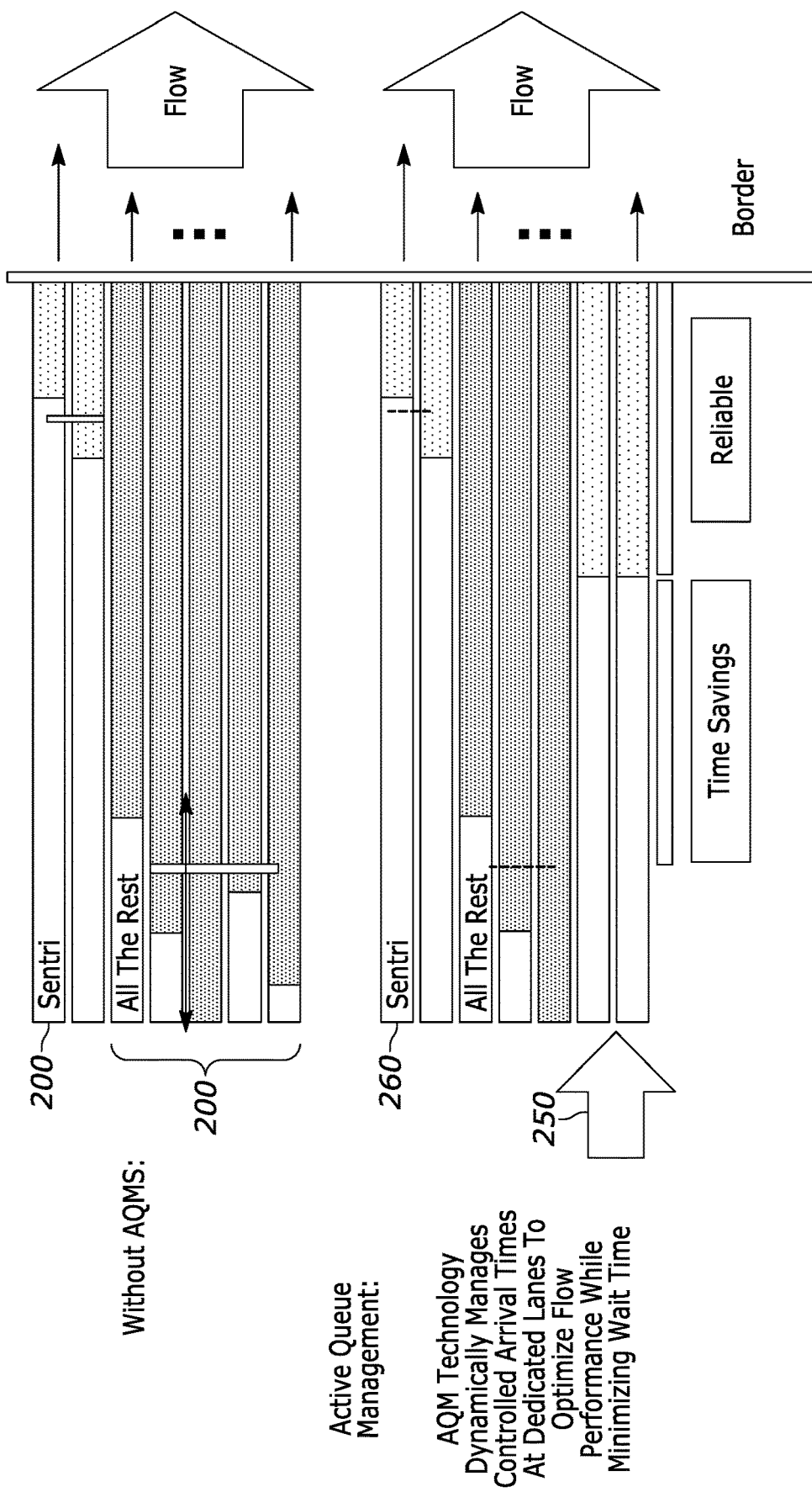
FIG. 2 is a schematic to help illustrate the AQMS's effect on managing arrivals consistent with present principles.

As may be appreciated from FIG. 2, AQMS's effect on managing arrivals is illustrated. As shown in FIG. 2, chart 200 demonstrates that without an AQMS system operating consistent with present principles, wait times and queues for many traffic lanes 220 to cross a land border between different countries can be quite long. But with dedicated traffic lanes 250 being managed by an AQMS system (two of them per this example as shown at the bottom of chart 260), the AQMS technology can dynamically manage controlled arrival times at the dedicated lanes 250 to optimize flow performance while minimizing wait time. Note that the lanes 250 are considerably shorter than the three general "all traffic" lanes immediately above, providing time savings and reliability over current electronic systems for processing individuals crossing a border via a land port of entry.

With the foregoing in mind, additional principles will be elucidated for an AQMS consistent with present principles, with the AQMS helping address customs congestion at land ports of entry (LPOEs) through a dynamic port approaching system.

Focusing on personal vehicles in the first stage, the analysis may start with a systems engineering approach which helps to identify and characterize the conditions and constraints of such environment. This is illustrated in FIG. 3, which shows a top plan view of traveler class-lanes and an example deployment of AQMS at a port of entry between the United States and Mexico.

Different operations research techniques orient this aspect through two unique approaches. First, a traveler behavior shift via dynamic scheduled arrival times to dedicated lanes prior to LPOEs. Second, fluid concepts for a method for traffic flow optimization via an active queue management system (AQMS).

The outcome is a dynamic batch-maker for vehicles arriving at customs facilities. The system is capable of scaling in volumes and across LPOEs to alleviate congestion of queues and make wait times more reliable for millions of travelers every year.

Figure 3:
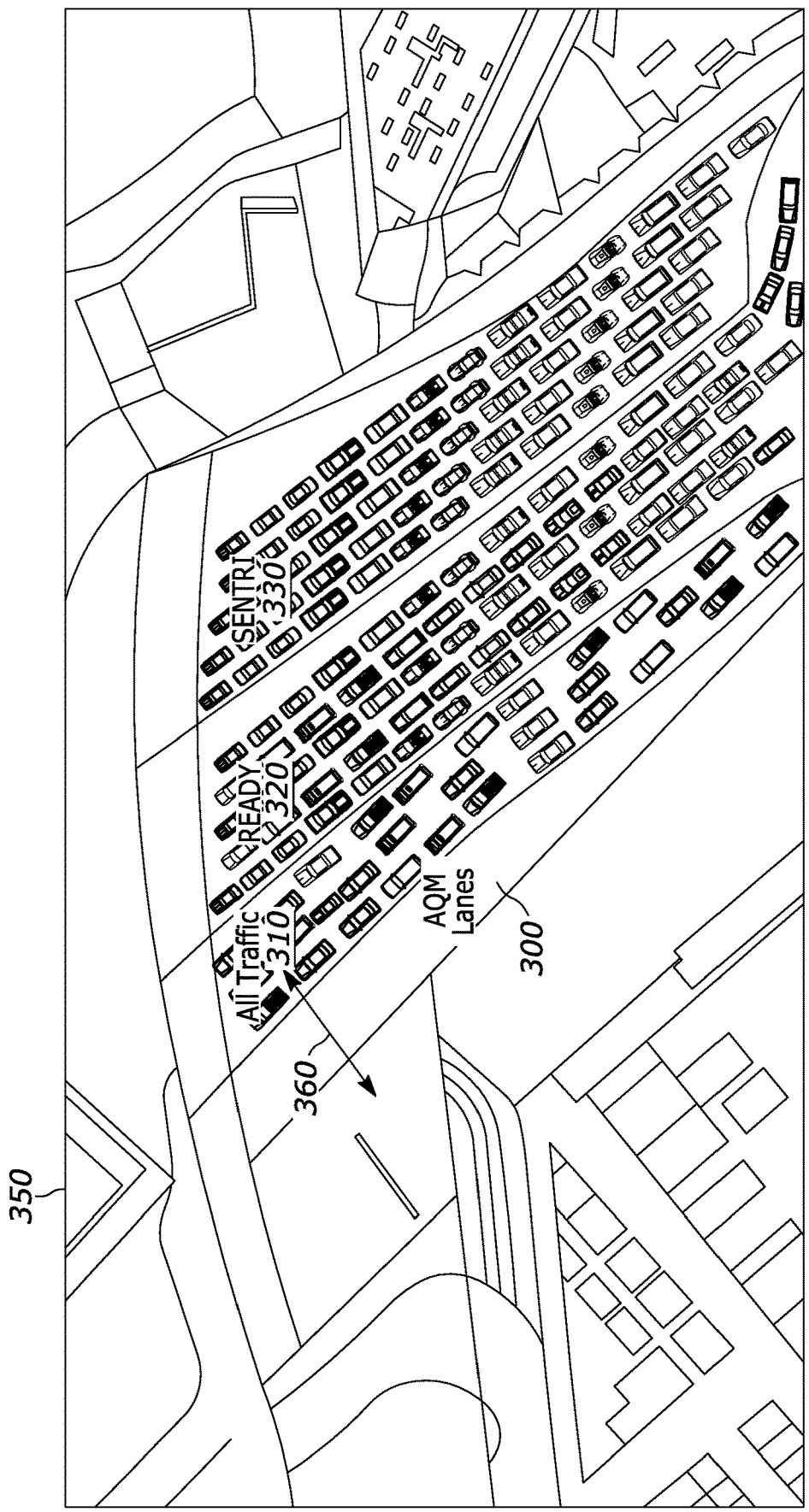
FIG. 3 shows a top plan view of traveler class-lanes and an example deployment of the AQMS at a port of entry between the United States and Mexico consistent with present principles.

As shown in FIG. 3, one to three AQMS lanes 300 (or even more) may be disposed next to lanes for other classes of travelers, including "all traffic" lanes 310, Ready lanes 320 for the Ready Lane program, and SENTRI lanes 330 for the SENTRI program. Thus, the AQMS lanes 300 may be permanent, dedicated lanes with their own management flow rate that might differ from the flow rate of the other lanes 310-330. Or in another example, the AQMS lanes 300 may be lanes temporarily reallocated from existing lanes of a different lane class, such as some of the SENTRI lanes 330 or "all traffic lanes" 310 being reallocated on an ad-hoc basis as AQMS lanes 300.

Though not shown in FIG. 3, if desired a parking lot may be maintained for people to wait to enter the AQMS lanes 310 at their designated time. The parking lot may have its own boom barrier to provide entry to the lot so that only people with scheduled arrival times for the lanes 300 can enter and wait in the parking lot until their scheduled arrival time is reached. The AQMS may therefore manage the boom barrier to the parking lot as well, only permitting entries for AQMS participants that have a scheduled arrival time that is no more than a threshold amount of time away (e.g., no more than thirty minutes away) to also prevent congestion at the parking lot. Also note that while AQMS participants may enter the lanes 300 from a dedicated AQMS entry point 350 where the lane begins, other AQMS entry points 360 between the parking lot and lanes 300 may also be used. Note that each entry point 350, 360 may have a boom barrier or other type of barrier to permit entry into the lane(s) 300 themselves consistent with the disclosure below.

As mentioned above, a systems engineering approach consistent with present principles may involve the ability to address and represent the functional relations between different types of elements; either physical or non-physical, in a certain process that sometimes are not explicit and is useful for finding operational opportunity areas.

First, it is helpful to overview aspects related to queueing theory consistent with present principles, with this queuing theory generally forming part of the operations research field.

Figure 4:
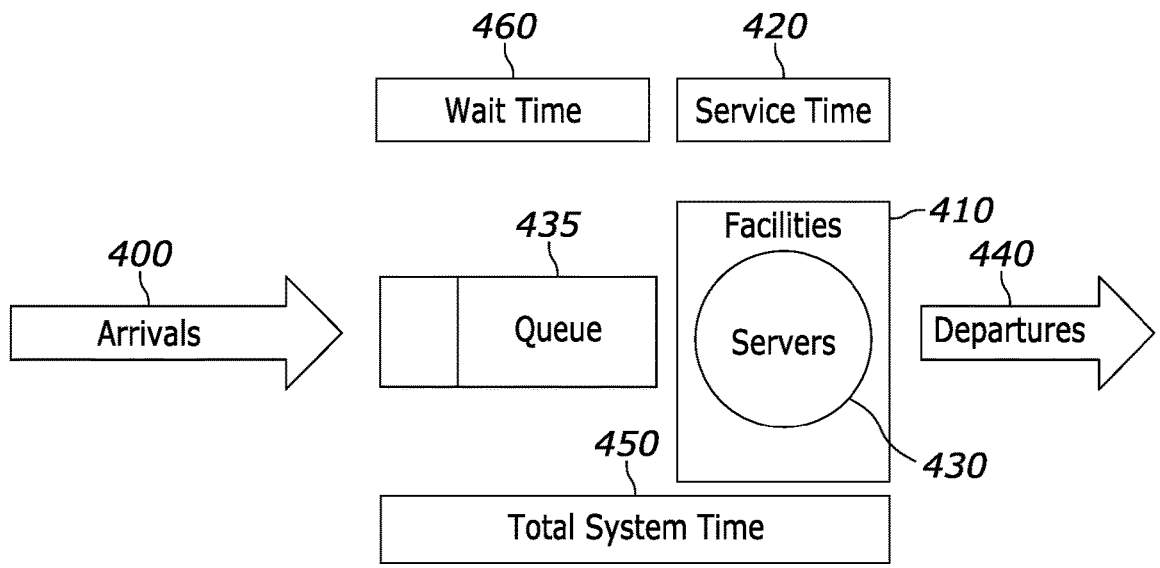
FIG. 4 is a schematic of an example flow of arrivals and departures from a land port of entry (LPOE) consistent with present principles.

Accordingly, given an input-output system with certain service facilities (e.g., servers) and a demand distribution of customers (arrivals), a waiting line (queue) will occur when the servers' capacity is less than the arrival rate of customers. FIG. 4 sets forth that certain elements of these systems may include inputs/arrivals 400, facilities 410, a service process(es) 420, servers 430, the queues 435, and outputs/departures 440. Note that total system time 450 (e.g., the amount of time a person waits in the queue 435 from when he/she enters to when the person is permitted entry into the country through the land port of entry) may be a function of queue wait time 460 while getting to the front of the line as well as actual service time 420 to process the person once at the front of the line.

Figure 5:
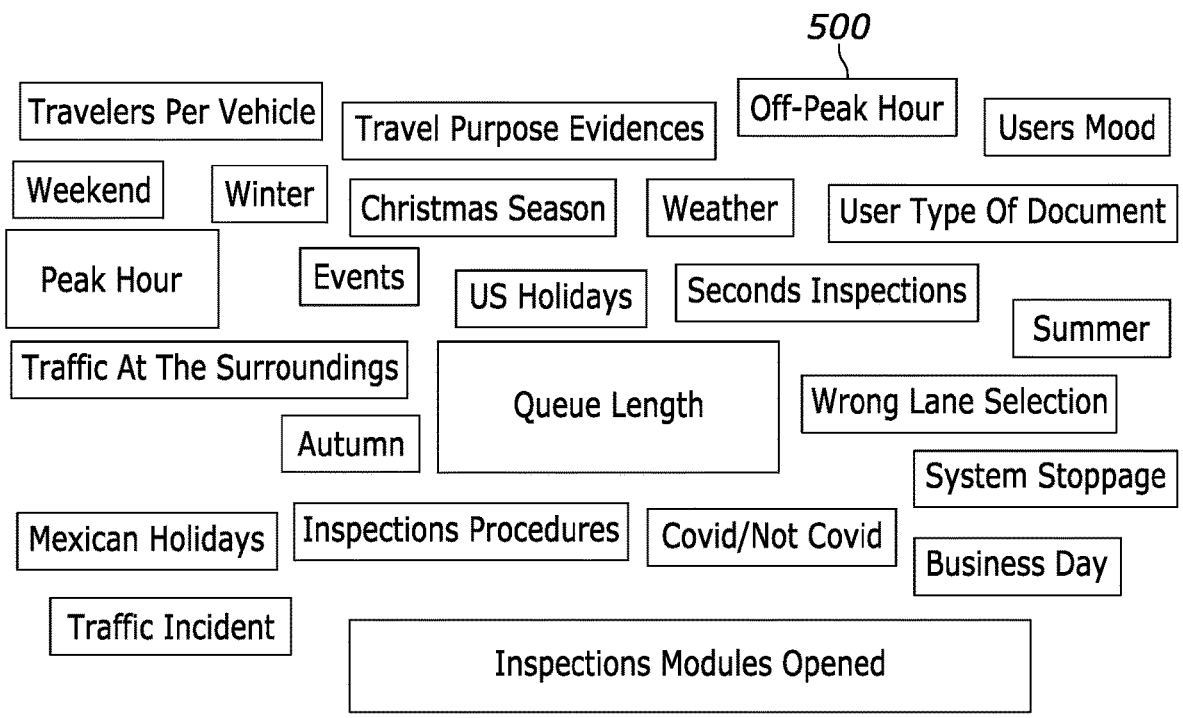
FIG. 5 is a word cloud of variables affecting wait times consistent with present principles.

For the border-crossing implementations in particular, FIG. 5 shows a list or word cloud 500 of variables affecting wait times and identifies the ones with more relative impact. As shown in FIG. 5, stochastic variables affecting queues performance are shown, with variables having higher algorithmic weights being presented in larger font than those with lower weights. The first insight of this approach is the recognition of stochastic behavior and a different level of interrelations between variables.

As shown in FIG. 5, example non-exhaustive, non-limiting variables include the following in no particular order: travelers per vehicle, weekend, winter, travel purpose evidences, off-peak hour, users' mood, peak hour, events, Christmas season, U.S. holidays, weather, seconds inspections, user type of document, summer, traffic at the surroundings, queue length, wrong lane selection, autumn, wrong lane selection, Mexican holidays, inspections procedures, Vaccination records requirements, system stoppage, business day, traffic incident, and inspections modules opened/currently operating.

As may be appreciated from FIG. 5, queue length is weighted the highest, while the variable of peak hours vs. off-peak hours is weighted lower but still higher than almost anything else except for the number inspections modules/stations opened. These variables demonstrate the types of data that an AQMS system may monitor in real-time to continually and dynamically manage arrivals and schedule additional arrivals. Indeed, present principles recognize that many of these variables cannot be ascertained in advance. Hence, a robust AQMS system with electronic sensors and logic as set forth below may be used for active queue management accomplished by an electronic system undertaking present principles in real time.

Figure 6:
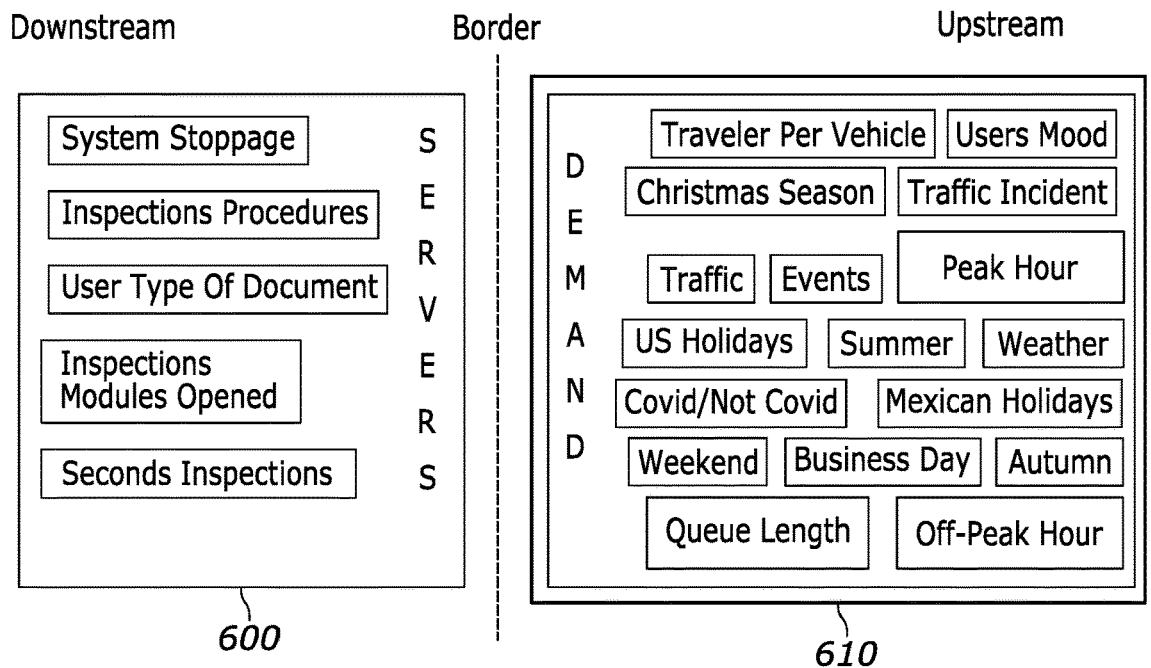
FIG. 6 shows a schematic of different upstream and downstream variables that may affect queue length consistent with present principles.

Present principles may allocate variables such as those above according to their dependency/origin, as demonstrated in FIG. 6. Notice that the servers 600 and queues 610 are in different countries. Also, FIG. 5 helps to visualize variables affecting demand that have an important opportunity to introduce changes to optimize servers' capacity. So per FIG. 6, variable classification and AQMS focus are demonstrated. As shown, the server(s) 600 may compensate for downstream variables such as system stoppage, inspections procedures, user type of document, the amount of inspection modules opened for permitting people across the land port of entry, and secondary inspections. In contrast, upstream variables (those on the other side of the border from the land port of entry) may include travelers per vehicle, users' mood, Christmas season, traffic incident, traffic, events, peak hour, U.S. holidays, summer, weather, vaccination records requirements, Mexican holidays, weekend, business day, autumn, queue length, and off-peak hours. Note that these upstream variables relate to demand for border crossings, while the downstream variables are not directly related to demand but still affect flow rate through the lane(s) of the land port of entry.

Queue characterization will now be described in greater detail. Concerning queuing theory, note that when a user cannot be cleared immediately at his/her arrival time, then the user will be in a queue system per FIG. 4.

The following concepts address notable elements of the cross-border queue system determining the overall system performance consistent with present principles.

Beginning first with multi-class (discrete), note that different travelers' accreditation documents and profiles may be wide in differences and scope. For this reason, the roads connecting to land ports of entry have up to four general classes of lane segmentation as previously discussed in reference to FIG. 3.

Specifically, the first class is SENTRI/Global Entry. SENTRI stands for Secure Electronic Network for Travelers Rapid Inspection, which is a program for fast clearance at a border crossing. It is managed by Customs and Border Protection (CBP) in the United States, an organization that is part of the U.S. Department of Homeland Security. The program involves an extended application process that discards an important segment of the commuter universe. But this group is treated with the highest level of trustworthiness compared to others.

The Ready Lane class is a second class. It is an intermediate agile inspection program for low-risk commuters. The program is available through the traditional visa application process. Members of this class are provided an identification card containing RFID technology. These cards can be quickly run by government officials at booths at the port of entry.

The "all traffic" class is a third class. Here, the remaining lanes at the port of entry work for a broader scope of commuter profiles. These lanes have the longest clearance/wait times on average.

Other lanes can constitute a fourth class. In some land ports of entry such as the San Ysidro Port of Entry, there are programs for dedicated lanes with specific commercial purposes like medical tourism or express business travelers. These arrangements are usually conceived and managed as led by municipal authorities on the Mexican side of the border.

As another concept addressing notable elements of the cross-border queue system determining the overall system performance consistent with present principles, note that for the multi-server (discrete) element, the land ports of entry service area has a parallel multi-server arrangement (as shown in FIG. 3), which expands the lane section just prior to the inspection modules/stations, and a serial arrangement of service areas downstream for secondary inspections. Also, the servers' assignment to different commuter categories is adjustable according to demand or to any specific policy.

Figure 7:
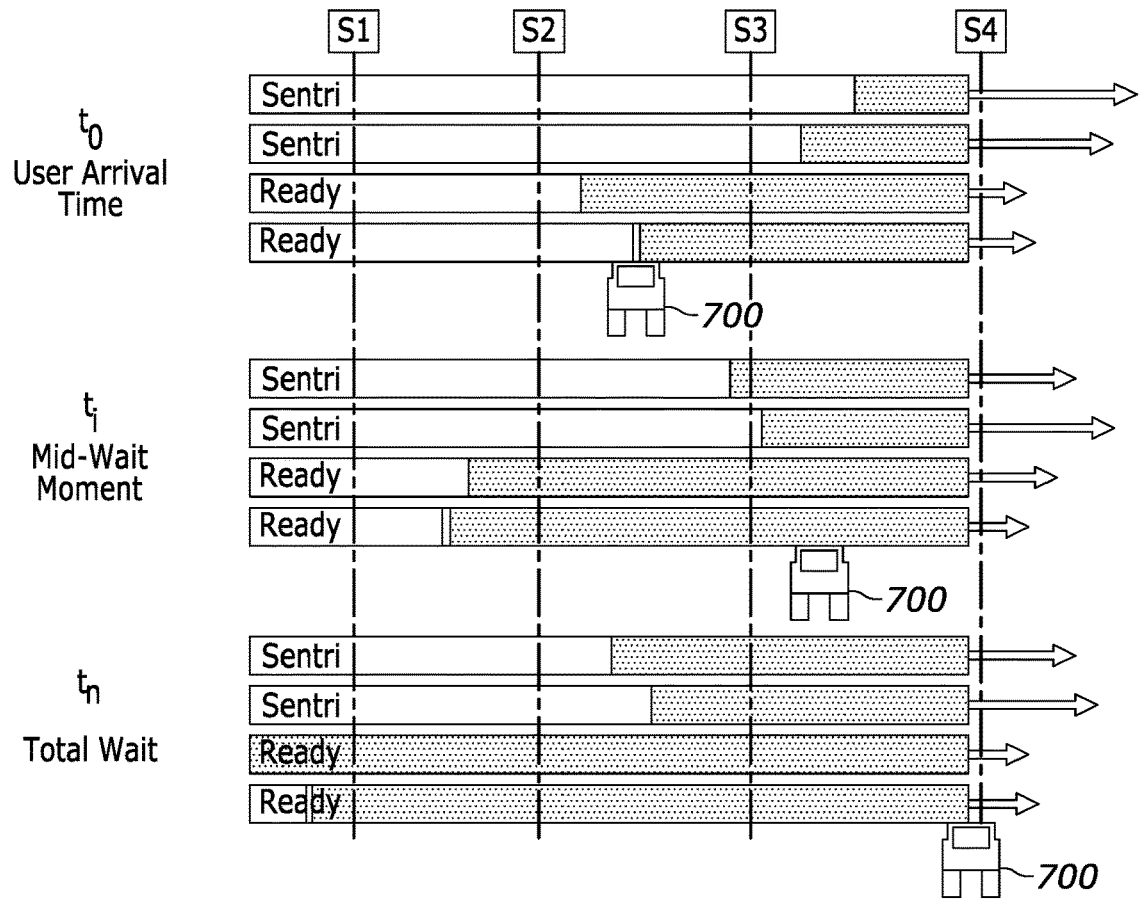
FIG. 7 shows a schematic of a user progressing through a queue at different times to help illustrate present principles.

As yet another concept addressing notable elements of the cross-border queue system determining the overall system performance consistent with present principles, note that for the service rate distribution (discrete) element, as mentioned above different commuter categories experience different clearance times, and there is also randomness between consecutive services at booths as demonstrated in FIG. 7 (e.g., due to different rates at which the government officials might individually process people, different issues that might arise such as prolonged questioning and inspection of a given vehicle, different traveler documentation that might have to be authenticated, etc.).

As still another concept addressing notable elements of the cross-border queue system determining the overall system performance consistent with present principles, note that for the arrival rate distribution (discrete) element, commuter arrival distribution is strongly related to peak and off-peak hours. In addition, the distribution has different demand patterns across lanes as may be appreciated from FIG. 7 as well.

Describing FIG. 7 in more detail, note that it shows dynamic queues system performance based on a variety of factors. When the user 700 arrives at the back/end of the queue at time $T_0$, each of the four respective lanes shown have respective first queue lengths. As time progresses while the user 700 waits in his/her vehicle, $T_1$ demonstrates that the lengths of each queue have changed, and in fact each queue has gotten longer during the user's mid-wait moment. Then at time $T_n$ when the user 700 reaches the front of the respective queue, the total wait time has been reached and the user is processed by a government official at the module/booth before being permitted (or denied) entry into the other country via the land port of entry. Note that the queues/lines are even longer at time $T_n$.

Other characteristics may be at play as far as the cross-border queue system determining the overall system performance. For example, some human behaviors contribute to queues performance deterioration, including the lack of physical limits upstream of land ports of entry that produce apparently endless admission capacity, allowing travelers to enter the queue under any condition. Other human behaviors that contribute to queues performance deterioration include lane changes that are motivated by momentary or negligible differential time benefits or booth availability, and users taking advantage of alternative roads/streets to enter the queue by skipping part of the queue (system corruption).

It may be appreciated based on the foregoing that, absent present principles, the case of land ports of entry represents an often-overloaded system with multiple challenging properties. Accordingly, by focusing on arrival management (and other aspects discussed herein), the AQMS consistent with present principles points out a notable element for queues performance, with significant positive effects on many of the issues addressed above.

Figure 8:
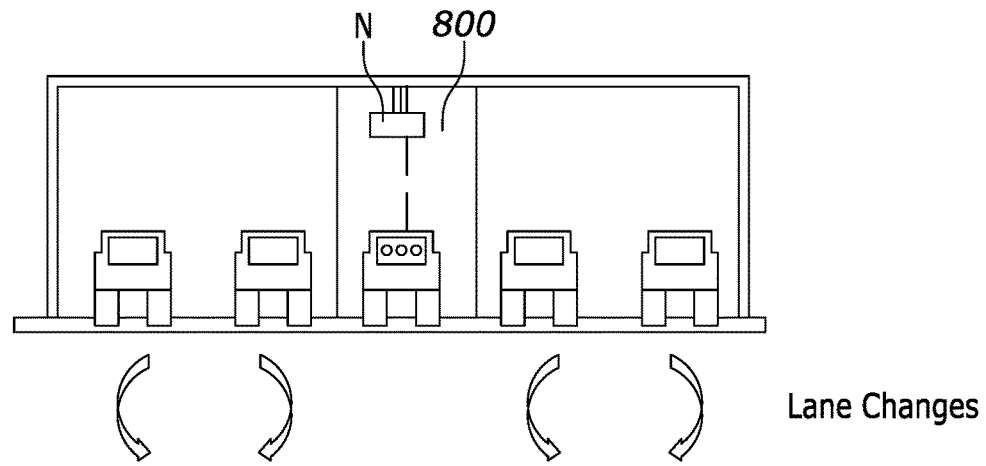
FIG. 8 shows a schematic of lane control sections consistent with present principles.

Next in terms of controlled lanes and sections, note that the nature of the servers' procedures in the latter circumstances prompted the design of a series of lane control sections as shown in FIG. 8. The lane control sections may be upstream of the land ports of entry and have lane barriers suitable for each of them. The AQMS may thus obtain real-time measurements of traffic flows for specific lane classes "n", creating a gauging station.

As shown in FIG. 8, a control section number "N" with segmented lane 800 is shown. The control section "N" may be established by a boom barrier or other type of barrier such as retractable metallic spikes in the ground or a steel door that rises and lowers from the ground. Accordingly, by controlling entry to the lane 800 and using concrete barriers or other means to keep the lane 800 separate from other lanes (disallowing lane changes), more certainty is introduced into the AQMS for scheduling subsequent arrivals, whereas the other lanes shown still permit at-will entry and lane changes (which can create a higher degree of unpredictability and volatility).

Additionally, as mentioned above a physical barrier that enables automated controlled access can help to complete a flow control section and introduce more certainty into the system. More specifically, this not only ensures lane performance measurement, but it is also a mechanism to manage the input rate to the system and establishes a physical limit. For personal vehicles, the device to ensure lane access may be an automated boom barrier with remote control and RFID technology for recognizing incoming users via active RFID based on signals transmitted from an active RFID transmitter brought by the user and/or affixed to the user's vehicle, though other techniques are also possible to accomplish the same function, such as license plate recognition, passcode entry, etc.

Figure 9:
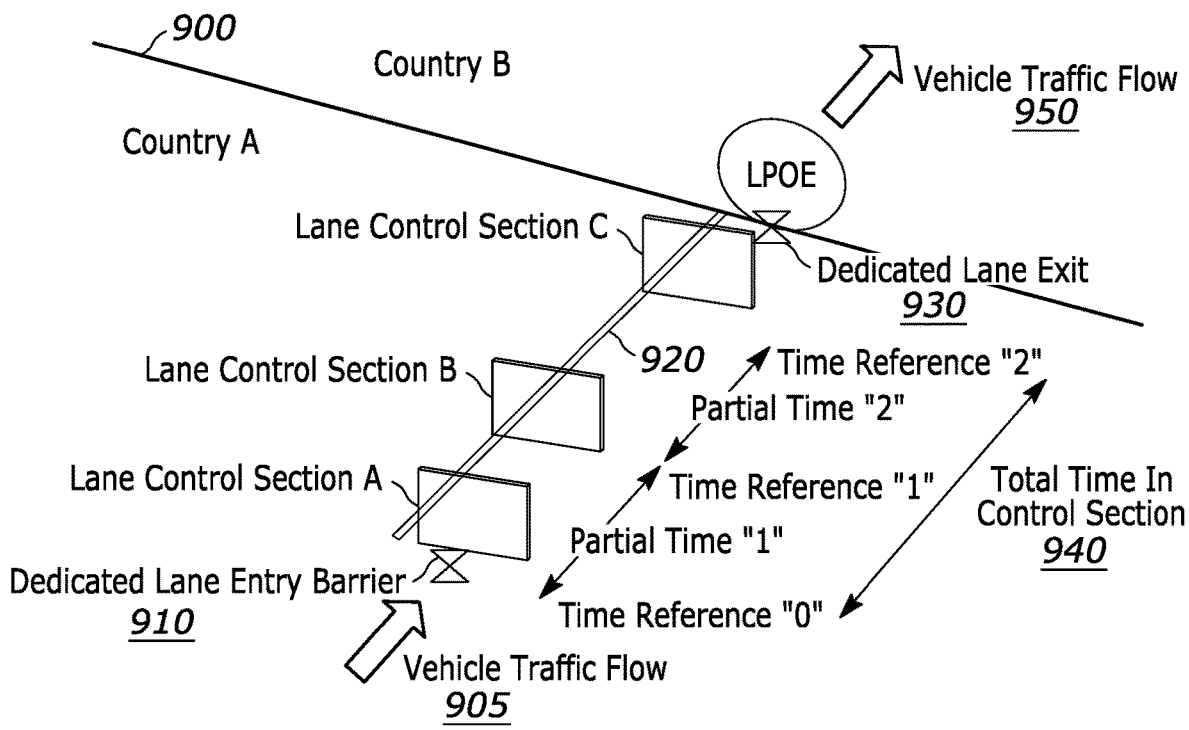
FIG. 9 shows a traffic control section for a traveler class "n" in overview consistent with present principles.

FIG. 9 demonstrates. This figure shows a complete traffic control section for any traveler class "n" in overview. As shown, an international border 900 exists between country A and country B. As also shown, an inbound vehicle traffic flow 905 into the particular lane 920 is regulated by a controllable, dedicated lane entry barrier (e.g., boom barrier) 910, beyond which are lane control sections A, B, and C as shown. The lane control sections may separate partial time 1 between section A and B from time reference 0 to time reference 1, resulting in partial time 1. Likewise partial time 2 may be between section B and C from time reference 1 to time reference 2, resulting in partial time 2 while the user approaches the land port of entry's dedicated lane booth and exit 930. The partial times 1 and 2 may therefore result in a total time in control section 940 prior to engaging a government official at the booth/exist 930 and being permitted from country A into country B, with the rate of vehicles being permitted entry resulting in outbound vehicle traffic flow 950.

Before moving on, note with respect to the lane control sections A-C that these may not be arbitrary points in the lane 920. Rather, they may be physical locations in the lane 920 at which vehicle flow sensors may be disposed for monitoring the flow rate of vehicles past the respective sensor(s). The flow sensors may therefore be RFID sensors for, e.g., sensing the same active RFID transponder used by the respective user to gain entry through the barrier 910. Additionally or alternatively, radar guns and other types of radar sensors/systems may be used, as may infrared proximity sensors, cameras, and still other types of sensors.

Another notable decision consistent with present principles is the location of the entry boom barrier. Present principles recognized that an urban traffic study may be used to ensure a steady flow of vehicles accessing the controlled section.

In this way, the AQMS may provide lane performance data for the different lane classes, while controlling queue length. The AQMS technology platform may thus respond to any specific changes in flow policy.

Turning to other active queue management principles, note that approximating time-slot capacity will now be discussed based on the understanding that a subject port of entry has established a segmented northbound lane(s) (in the case of a Mexico-to-United States crossing as an example), real-time measurements within the lane(s), and the ability to influence the input rate consistent with present principles.

Beginning first with the Continuity Principle, which might also be known as the Balance Equation or Mass Conservation principle, it is to be understood that present principles may employ fluids and dynamic problems, among others. The Continuity Principle here generally states the following: for any given flow in a network without leakages, the total flow rate inside the network is equal to the net sum of all the partial rates inside the network, considering the sum rules of networks.

The application of this principle and concepts for the AQMS system is in relation to the segmented (dedicated AQMS) lane in which the perceived rate Q in the traffic control section (including, for example, lane control sections A-C of FIG. 9) is close to the overall rate of departures D provided by the servers. This is represented in FIG. 10, with it being further noted that the rate of departures D may also be determined based on sensors at the exit 930 or just beyond it.

Figure 10:
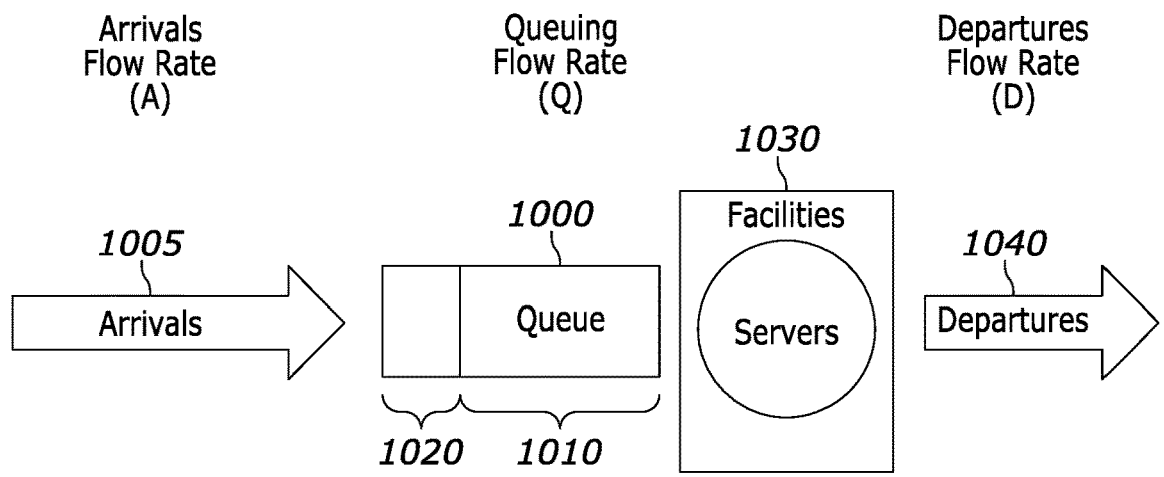
FIG. 10 is a schematic of an example flow of arrivals and departures using a continuity principle for the AQMS consistent with present principles.

In reference to FIG. 10, the Continuity Principle for the Active Queue Management System is illustrated. As shown, an arrivals flow rate A for arriving vehicles 1005 translates into a queueing flow rate Q for the relevant AQMS lane (the queueing flow rate Q also being impacted by other factors such as the rate at which departing vehicles are processed, for example). Note that the queue 1000 as shown currently includes more than one vehicle but in total amounts to less than a total target maximum number of vehicles for the queue of the lane. Thus, the current/filled queue section 1010 and available unfilled queue section 1020 amount to the total target maximum. As also shown in FIG. 10, certain service facilities 1030 (e.g., modules/booths and assisting servers) are also shown, which together control the departures flow rate D for departing vehicles 1040.

Turning now to scheduled arrivals capacity estimations that may be used consistent with present principles, note that through dynamic queuing timeslots, the AQMS may establish an arrival rate A emulating the flow rate at the control section (as demonstrated by FIG. 11 in conjunction with FIG. 10), establishing the basis of a pattern of scheduled arrivals with a first order effect on user wait times, and for the overall queues system performance.

Figure 11:
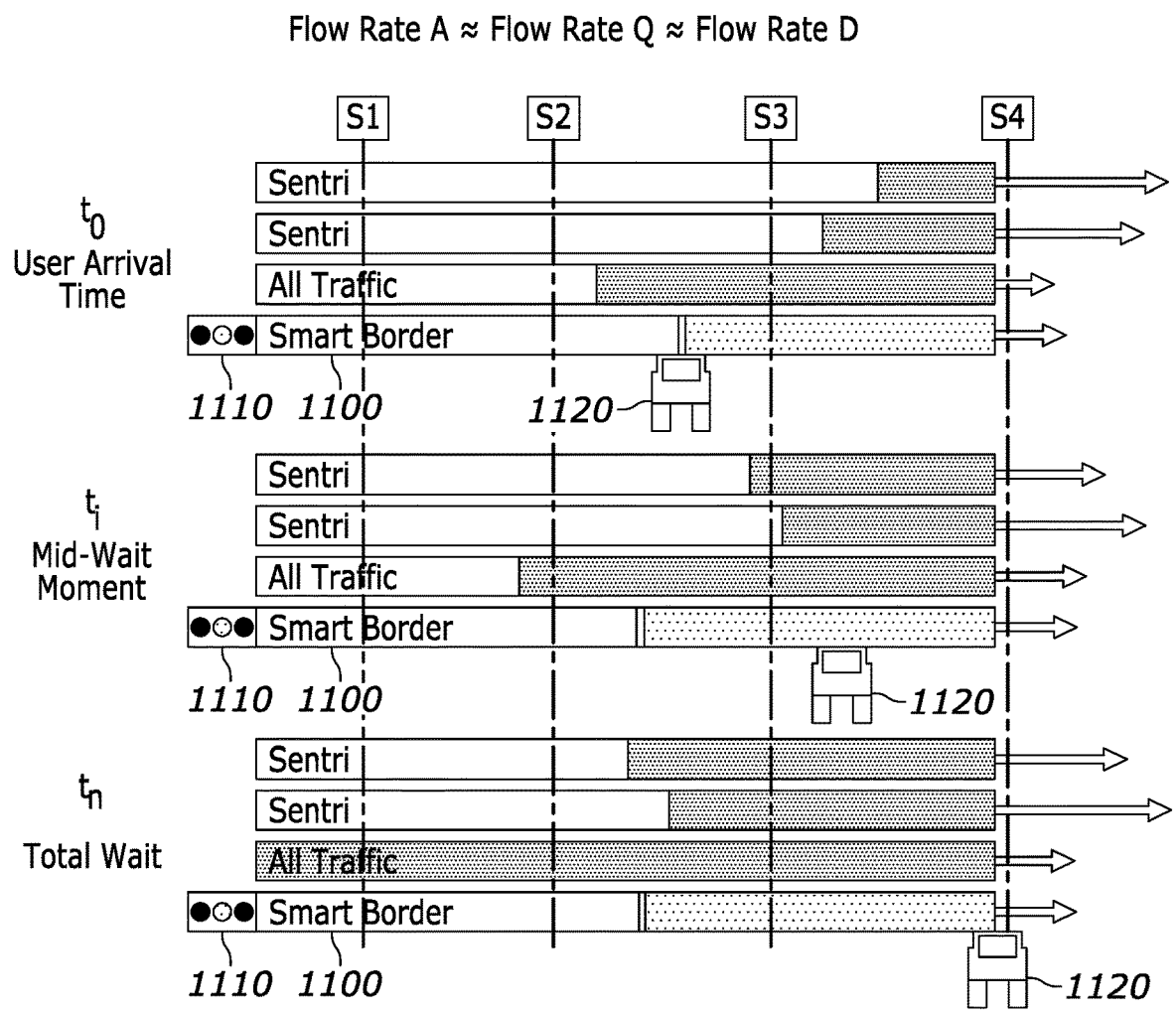
FIG. 11 shows a schematic of a user progressing through a queue at different times using the AQMS consistent with present principles.

FIG. 11 thus shows the effect of scheduled arrivals managed by the AQMS. As shown in this figure, the "smart border" lane (AQMS lane) 1100 has a traffic signal/traffic light 1110 with red, yellow, and green lights to control the flow of vehicles into the lane 1100 (e.g., in addition to or in lieu of boom barriers). Thus, users may proceed with their vehicles past the light 1110 when it is green, proceed with caution when the light 1110 is yellow, and not proceed when the light 1110 is red.

As also shown in FIG. 11, among the vehicles in the lane 1100 is a first user's vehicle 1120. At time $T_0$ when the first user arrives in the vehicle 1120, the light 1110 controls the arrivals flow rate A in part by allowing the vehicle 1120 to pass by at a designated time or time frame, and the vehicle 1120 may then drive up to the back of the line as illustrated for time $T_0$.

Then at time $T_1$, a mid-wait moment, the vehicle 1120 has progressed farther in the queue according to flow rate Q, with vehicles ahead of and behind the vehicle 1120 (and with the smart border lane 1110's queue growing relative to time $T_0$). Thereafter, at a time $T_n$ at the end of the total wait time for the vehicle 1120, the vehicle 1120 has reached the front of the queue where a government official may approve entry of the vehicle 1120 into another country, affecting departure flow rate D. Thus, note consistent with present principles than in at least some instances, the flow rates A, Q, and D may be roughly the same, such as the same to within a threshold level of tolerance as set by an AQMS system administrator, technician, government entity, etc.

Again, because of the special function of the servers' roles in this non-limiting example, constant vetting times at servers cannot necessarily be expected, so the AQMS may adjust the arrival rate of commuters permanently here, responding to servers' capacity (and the dedicated lane's capacity) in real-time. For this, a (safety) capacity factor for each arrivals batch may be used to absorb fast flow rate changes, maintaining reliability for users in the system. The remaining batch's capacity may be offered for last-minute reservations with constant updates (as demonstrated in FIG. 12 as will be described in a moment).

Then the formula to calculate the number of scheduled arrivals with respect to time as computed by the AQMS may be as follows:

$$\frac{dA_n}{dt} = \frac{dQ_n}{dt} \times \frac{dS_n}{dt} \leq \frac{dD_n}{dt}$$

Where:
dA—Arrival flow differential (Advance+Last-Minute scheduled arrivals)
dQ is Queuing flow differential
dD is Departures flow differential
dS is Capacity factor differential (0-0.99, preferably 0.8-0.95 in non-limiting examples)
dt is Time Differential
n is Traveler Class lane for an AQMS participant Thus, as may be appreciated from the equation, the arrival flow rate A may be equal or roughly equal to the flow rate Q through the queue itself, with the flow rate Q being less than or equal to the departures flow rate.

Figure 12:
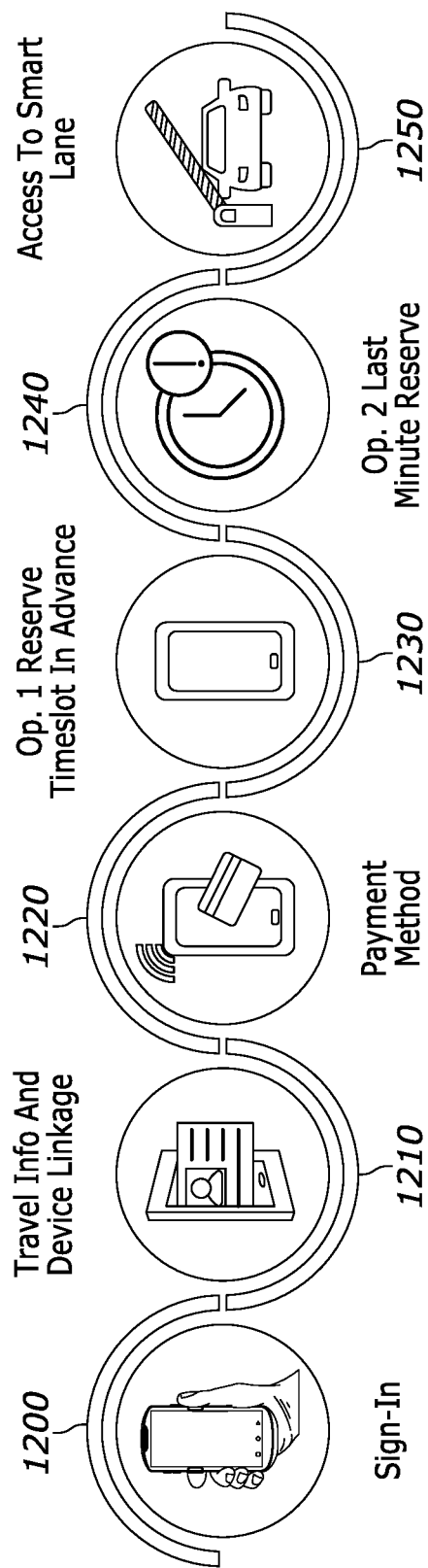
FIG. 12 demonstrates user workflow in the AQMS digital interface consistent with present principles.

Turning to FIG. 12, this figure shows user workflow in the AQMS digital interface. As shown in FIG. 12, the user may sign in at step 1200, provide travel info and link his/her client device at step 1210, and provide a payment method at step 1220 (e.g., AQMS may be based on an end-user subscription model if desired). Then as a first option, at step 1230 the user may reserve a timeslot in advance of when he/she would like to cross a land border between two countries. As a second option, at step 1240 the user may make a last-minute reservation to cross the border not at a time to be scheduled in the future but as soon as possible based on current capacity. Step 1250 demonstrates that eventually the user will gain access to an AQMS smart lane at a determined arrival time provided to the end-user.

The AQMS may use an information technology platform and expertise in system architecture design as well as daily operations administration during deployment, ensuring a reliable system.

Thus, the AQMS synchronizes the servers' capacity and the vehicle arrival rate in real-time. To do this, the dynamic scheduling platform may rely on physical and digital infrastructure for the coordination of tens of thousands of vehicles.

Figure 13:
FIG. 13 shows a top plan view of different traveler class lanes that use the AQMS consistent with present principles.

Additionally, leveraging adjustable lane barriers between traveler classes, the AQMS may fit arrival demand capacity for "n" classes in an optimal way, as demonstrated by FIG. 13. This figure therefore shows adjustable class-lane capacity suiting AQMS demand per traveler class "n". Accordingly, in addition to or in lieu of AQMS participants having a dedicated lane per FIG. 3, AQMS participants per FIG. 13 may be participants in other programs as well and therefore some or all lanes of other classes (including the "all traffic" class, Ready class, and SENTRI class) may each use the AQMS as well for queueing up and getting people through their respective lane as well. This is illustrated by assignation of the acronym "SBS" for some of the lane classes as shown in FIG. 13, with SBS standing for Smart Border Systems, the current assignee of the present disclosure.

Now in reference to FIG. 14A, an example graphical user interface (GUI) 1401 is shown consistent with present principles. The GUI 1401 (and ensuing client-side GUIs described below) may be presented on a client device display as part of a web browser-based Internet web page navigable by an end-user. Additionally or alternatively, the client-side GUIs may be presented on the client device as part of a dedicated software application ("app"), an instance of which may be separately stored and executable at each end-user's client device to schedule an AQMS arrival time and border crossing through the AQMS system consistent with present principles. Again note that the client device(s) may be smartphones, laptop computers, smartwatches, other wearable devices such as headsets (e.g., smart glasses, virtual/augmented reality headsets, etc.), and/or other types of client devices.

The GUI 1401 may be presented responsive to webpage retrieval or local app launch to begin the process of scheduling an arrival time at an entry lane of a land port of entry or other access point using AQMS consistent with present principles. Regarding other access points, note that present principles may be implemented for crossing through airport security at an airport, crossing through security at a sporting event or concert, and still other implementations where controlled access is desirable.

In any case, as shown in FIG. 14A, the user is given an option to select booking through a ReadyLane Plus entry lane (selector 1402) or SENTRI/Global Entry PLUS entry lane (selector 1403). Note that each one has a 20-minute arrival window per this example.

FIG. 14B then shows that another GUI 1404 may be presented based on, in the present instance, the selector 1403 being selected, though a similar screen may be presented responsive to selection of the selector 1402 (but for the different lane class). As shown in FIG. 14B, the GUI 1404 includes selectors 1406-1408 to select a soonest available lane overall amongst multiple LPOEs for the SENTRI/Global Entry PLUS program (selector 1406), to select a soonest available lane at a first port of entry (selector 1407), and to select a soonest available lane at a second, different port of entry (selector 1408).

Figure 14C:
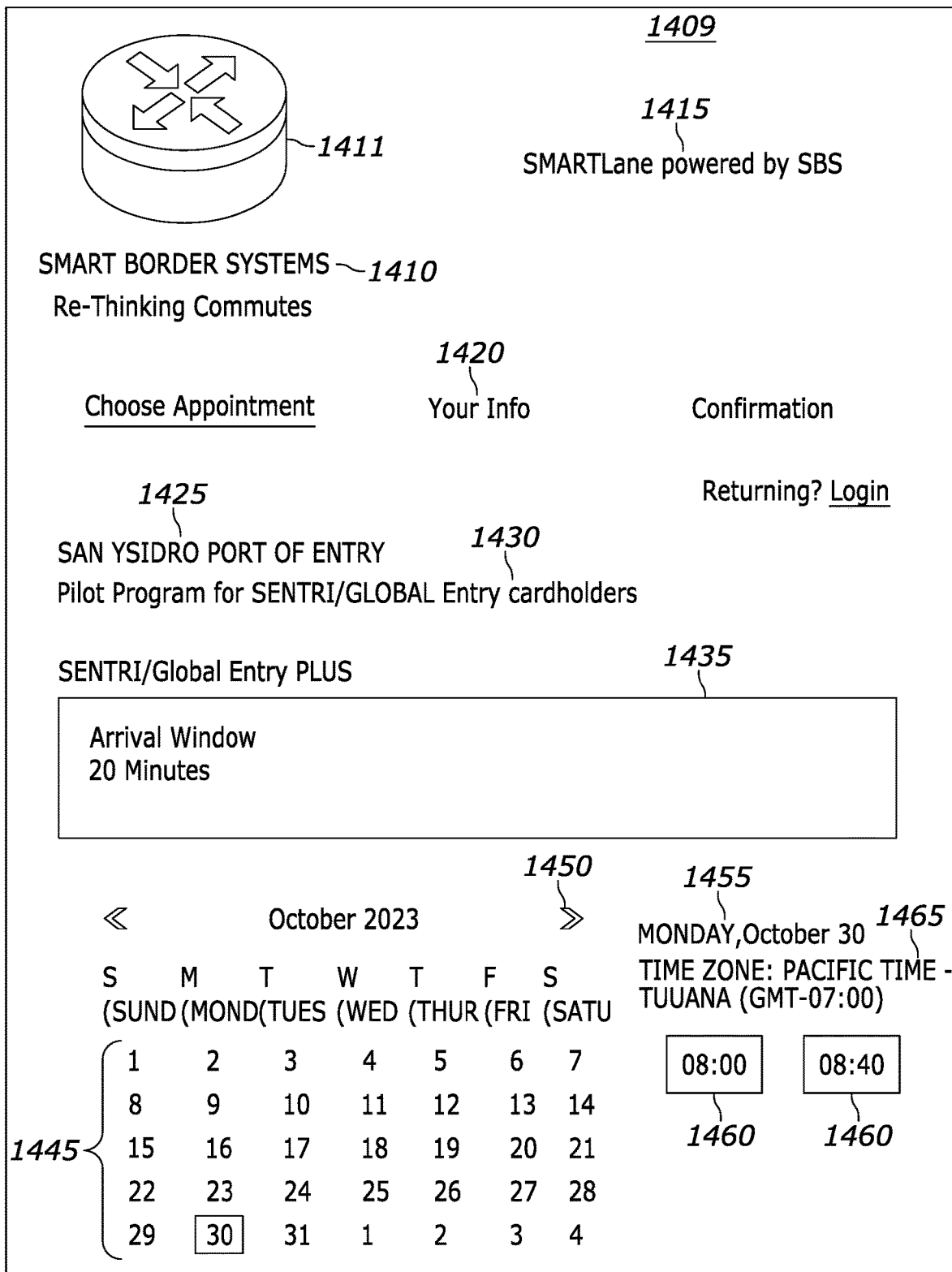
FIGS. 14a-20 show various graphical user interfaces (GUIs) that may be presented at a user's client device to book an arrival time using the AQMS consistent with present principles.

In response to selection of one of the selectors 1406-1408, the GUI 1409 of FIG. 14C may be presented. As shown in FIG. 14C, the GUI 1409 may include the logo 1411 and name 1410 of the entity owning, managing, hosting, etc. the AQMS. An example product name 1415 may also be presented.

As also shown in FIG. 14C, the GUI 1409 may present a progress bar 1420 that dynamically changes as the user progresses through the AQMS scheduling process to reflect the current progress of the user in scheduling the appointment. Per FIG. 14C, the user is at the first stage of the process where an appointment date and time are being chosen. Note that the GUI 1409 indicates a location and/or name 1425 for the land port of entry that the user wants to access. Note that the location and/or name 1425 may have been selected at a previous screen/GUI, such as the GUI 1404. The GUI 1409 also includes an indicator 1430 of the current government program through which the user is scheduling the appointment, which in the present instance includes an AQMS pilot program for SENTRI/Global Entry cardholders. Note, however, that other classes of travelers as set forth above might also be permitted to schedule an arrival through the AQMS (e.g., Ready Lane travelers).

The GUI 1409 may also include a notification 1435 of an arrival window of time of twenty minutes (or another configurable amount of time) during which the user is to arrive to be considered on time for the appointment being scheduled. The GUI 1409 further shows a calendar 1440 with selectable dates 1445 as shown to select the date that the user wishes to cross the U.S.-Mexico border using the AQMS. The user may thus scroll through months on the calendar via selector 1450 until a desired date is presented, and then select the desired date 1445 on the calendar 1440 itself. In the present instance, Oct. 30, 2023 has been selected and, as such, that date on the calendar 1440 includes a highlight box around it as shown to denote as much. The selected date is also presented on the GUI 1409 via indicator 1455, with the indicator 1455 being dynamically auto-populated to the GUI 1409 once the corresponding date itself has been selected by the user from the calendar 1445.

Currently-available times for the selected date may also be auto-populated to the GUI 1409 in the form of respective selectors 1460 responsive to the respective date being selected. Note that the times are local times for the respective land port of entry itself, which in the present instance is Pacific time as indicated via indicator 1465. The user may thus select one of the available times via the respective selectors 1460.

Figure 15:
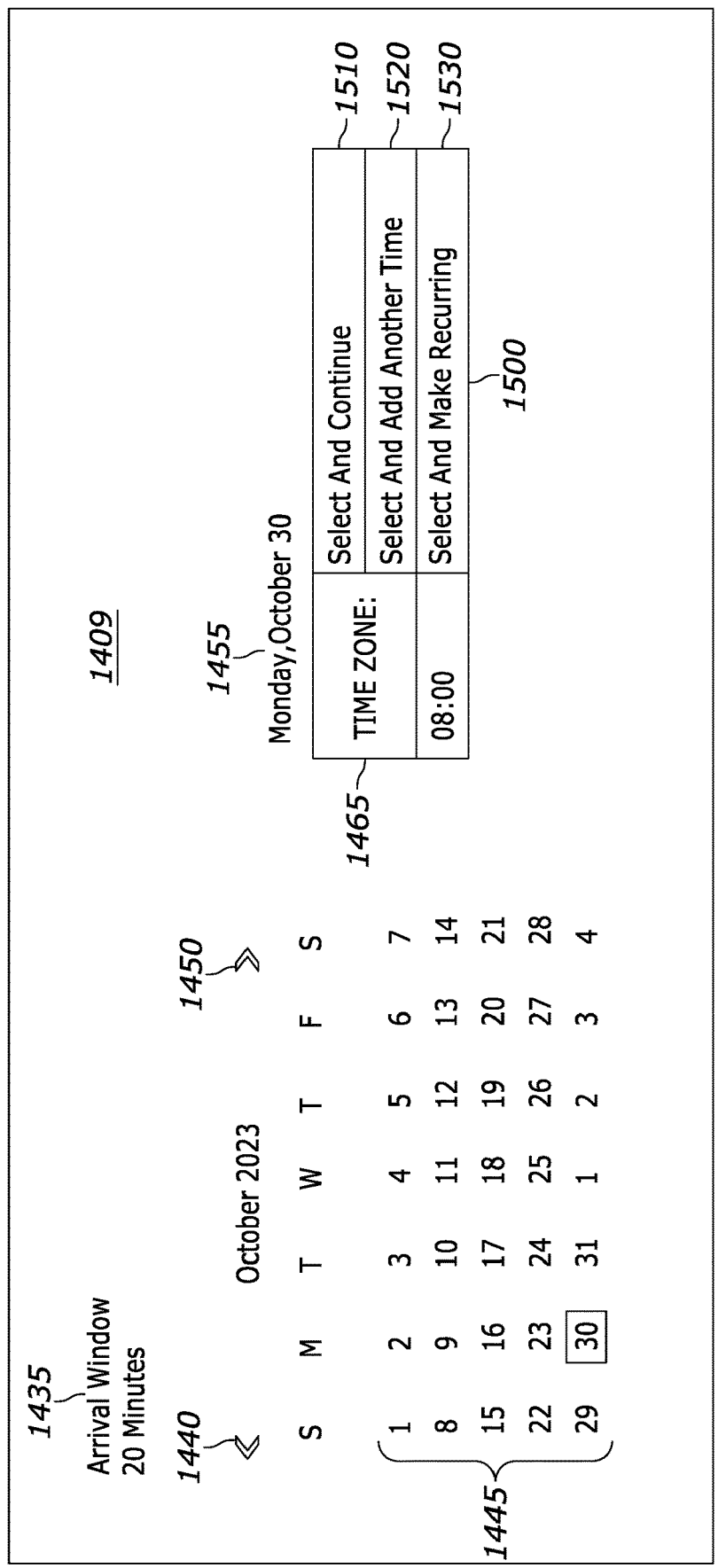

In response to selection of one of the selectors 1460, an overlay GUI 1500 as shown in FIG. 15 may be presented over top of some but not all of the GUI 1409. The GUI 1500 may include one or more selectors, such as a selector 1510 that is selectable to confirm the user's chosen date and time (Oct. 30, 2023 at 8:00 am per this example) and continue on to the next screen. Or the user might select the selector 1520 to provide a command to the AQMS system to confirm the user's chosen date and time and to also add another date/time appointment for another border crossing so that the user can efficiently schedule multiple crossings through the same process. As yet another example, the user may select the selector 1530 to confirm the user's chosen date and time and to also make the respective date and time a recurring time for multiple future crossings. The recurring time might be, for example, a border crossing on the $30^{th}$ of every month at 8:00 a.m. using a given traveler class lane.

Figure 16:
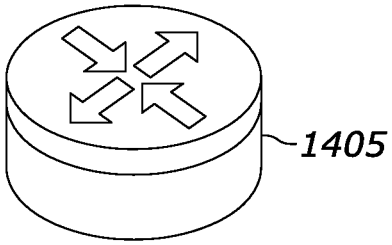

Assume for now that the user has selected selector 1510. In response, the AQMS may present the GUI 1600 shown in FIG. 16. Note that the progress bar 1420 has now changed to highlight that the user has reached the stage in the process where the user is to input personal information to schedule the appointment. First, note that if the user wishes to revert back to a previous screen for some reason, the user may select the "edit appointment information" selector 1605 to do so. Also note that an indication 1610 is presented to reflect the already-selected appointment time.

Regarding personal information, the information required by a given government agency or other manager of the crossing may vary in different situations. Accordingly, a respective input box may be presented for each type of information that the user is to enter. The user may enter the respective information by directing touch or cursor input to the respective input field and then using a hard or soft keyboard to enter the information. In the present instance, fields are provided for first name (field 1615), last name (field 1620), phone number (field 1625), and email address (field 1630). Once the user has entered all of the requested information for each field, the user may then select the "complete appointment" selector 1635 to complete/book the user's appointment in the AQMS per the selected arrival date and time.

Figure 17:
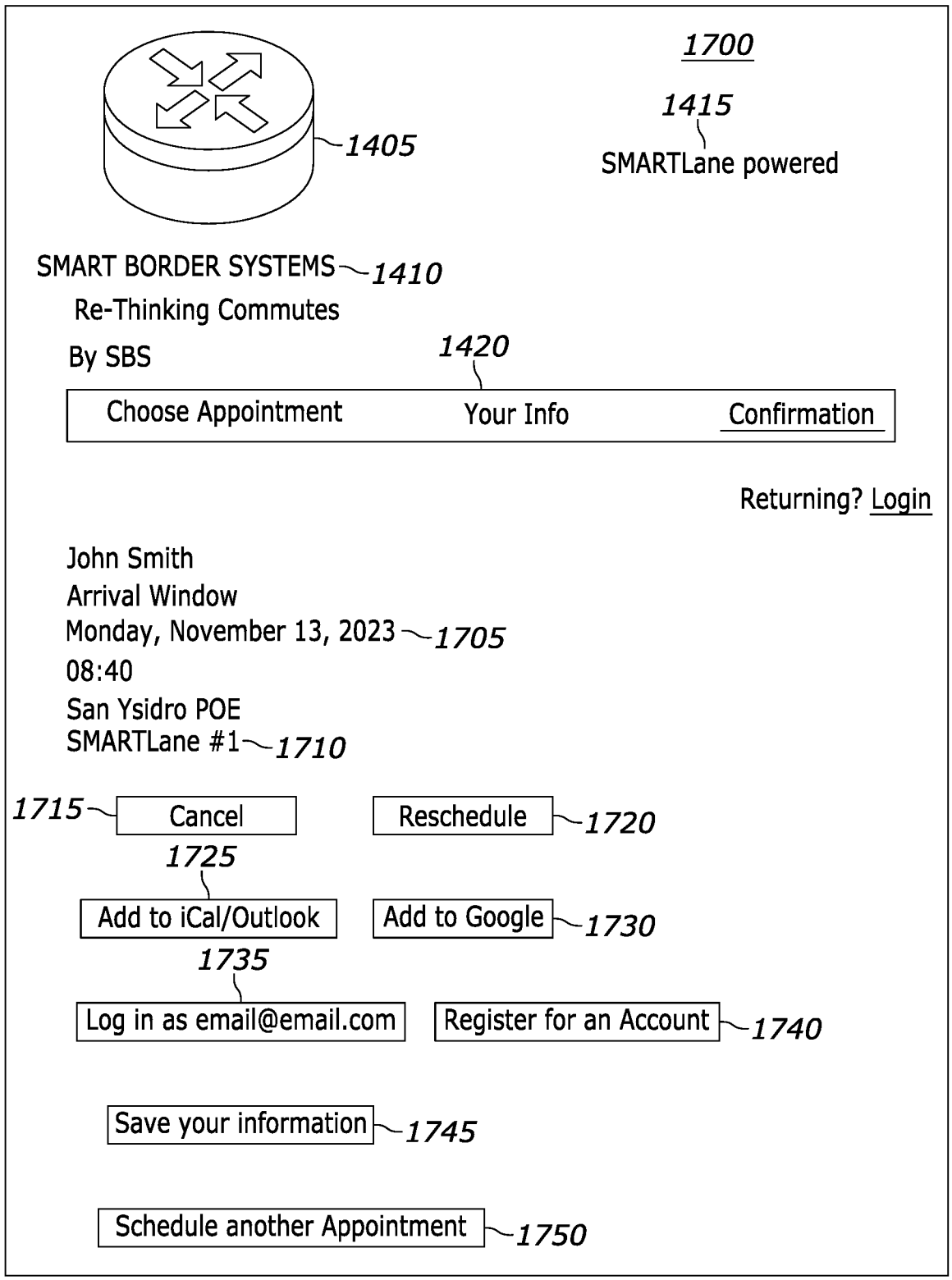

Accordingly, assuming valid information has been entered (and validated on the back end by the AQMS server(s)), FIG. 17 demonstrates that a confirmation GUI 1700 may be presented on the client device's display in response to selection of the selector 1635 (and/or validation of the info by the server(s)). Note that the progress bar 1420 has now changed again to highlight that the user has reached the confirmation stage in the process.

As also shown in FIG. 17, the GUI 1700 may include confirmation information 1705 with all of the user's selected and provided information. Note that the information 1705 also includes an indication 1710 of the particular entry lane at the land port of entry that the user is to enter per the scheduled appointment. If desired, the GUI 1700 may also include a cancel selector 1715 that is selectable to cancel the appointment, as well as a reschedule selector 1720 that is selectable to reschedule the appointment for a different date and/or time. Selectors 1725, 1730 might also be presented on the GUI 1700 and may each be selectable to automatically add a calendar entry for the appointment along with the appointment's information to the user's personal digital calendar as already linked to the user's client device (the different selectors 1725, 1730 being presented for different calendars/calendar types).

Still further, if desired the GUI 1700 may include login selector 1735 that may be selectable to present another GUI at which a user may login to the AQMS (e.g., if the user has not already done so), as well as a register selector 1740 that may be selectable to present another GUI at which the user may register for an AQMS end-user account if the user has not already done so. Or a "save your information" selector 1745 might be selected to save the user's information at the AQMS server(s) even without login or registration for subsequent lookup later (e.g., lookup instead being done via saved IP address or MAC address) to expedite another booking process by auto-populating information that was already provided for the current process. Still further, a selector 1750 may be selected to command the AQMS system to present the GUI 1409 again but for the user to schedule another appointment.

Figure 18:
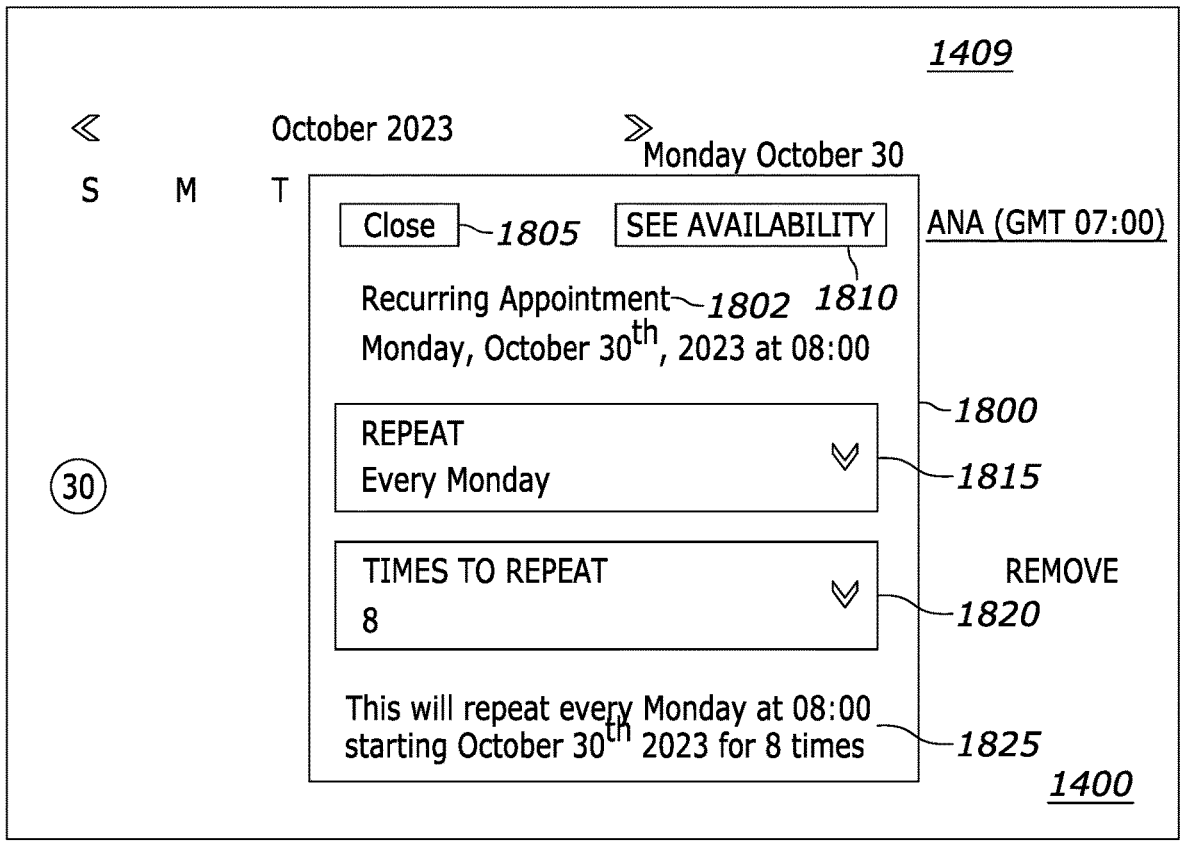

Referring back to FIG. 15 for a moment, suppose the user selected selector 1530 from the GUI 1500 to confirm the user's chosen date and time and to also make the respective date and time a recurring time. In response to selection of the selector 1530, the GUI 1500 may be removed and an overlay GUI 1800 as shown in FIG. 18 may be presented over top of some but not all of the GUI 1409 instead. The GUI 1800 may include a prompt 1802 as shown that may indicate that a recurring appointment is being booked. The prompt 1802 may also indicate the date and time of the first appointment (and, by extension, the dates and times of future appointments on the same day of the month and same time for future months).

As shown in FIG. 18, the GUI 1800 may include a close selector 1805 that may be selectable to close the GUI/window 1800 and to return to the GUI 1409. The GUI 1800 may also include a "see availability" selector 1810 that may be selectable to command the device to present availability for the recurring appointment based on selected day alone (not time of day) before the user enters specific information into the GUI 1800. Or the user may simply choose to enter specific information for the recurring appointment to see availability subsequent to that. To enter the information, the user may select the selector 1815, which may command the AQMS system/app to present a drop-down menu from which a recurring appointment day may be selected. In the present instance, a recurring appointment has been selected for every Monday. Another selector 1820 may also be presented, which may be selected to provide a command to present a drop-down menu from which a number of times that the recurring appointment is to repeat may be selected. In the present instance, eight has been selected as the number of times.

FIG. 18 also shows that once the user has entered the user's desired information via selectors 1815 and 1820, the GUI 1800 may auto-populate the information into the GUI 1800 as a text-based indication 1825. In the present instance, the information is presented as follows: "This will repeat every Monday at 8:00 starting Oct. 30, 2023 for 8 times." At this point the user may select the selector 1810 to see whether actual AQMS availability is open for the selected recurring appointment according to the information entered by the user.

Figure 19:
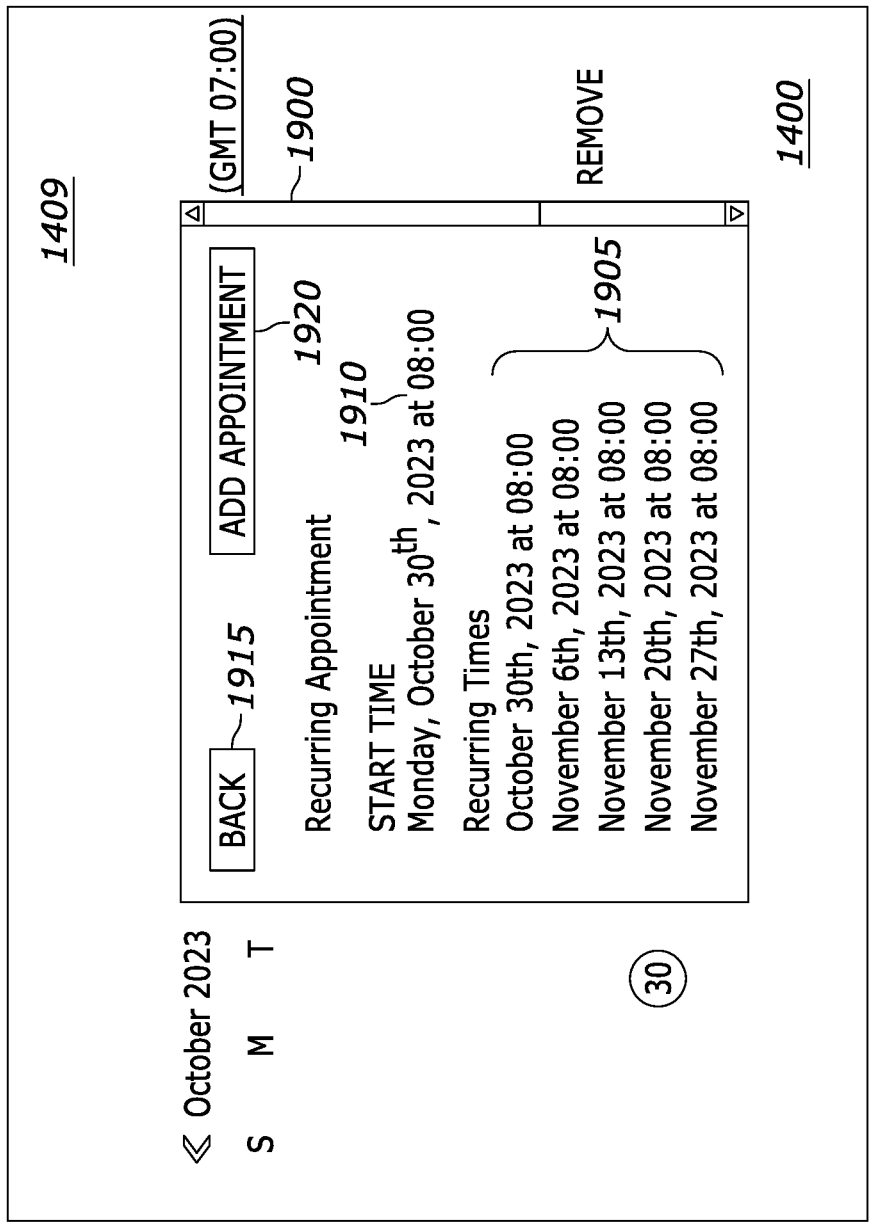

FIG. 19 therefore shows another GUI 1900 that may be overlaid on the GUI 1409 in response to selection of the selector 1810. The GUI 1900 may list available times for the requested recurring appointment based on current AQMS/calendar availability for the respective port of entry at which the user seeks to cross an international border. As such, a list 1905 of currently-available times is presented that conform to the user's request. A start time indication 1910 is also presented to indicate a first date and time for the first appointment amongst the recurring appointments. The user may then select the back selector 1915 to go back to the GUI 1800 to choose another recurring time if desired, or may select the "add appointments" selector 1920 to accept the appointments listed in the list 1905.

Figure 20:
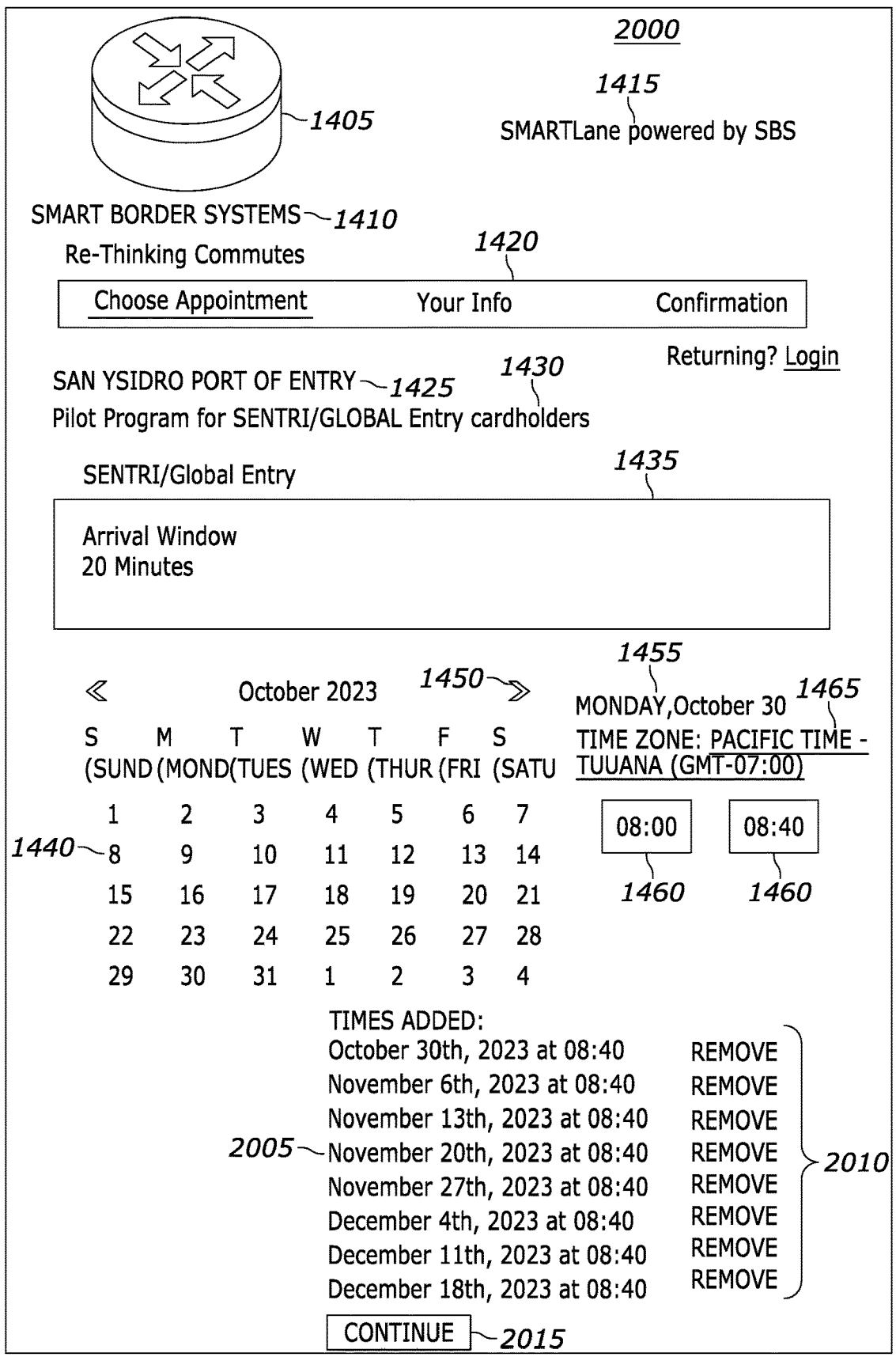

Therefore, responsive to selection of the selector 1920, the GUI 2000 of FIG. 20 may be presented. The GUI 2000 may be an adapted or dynamically-changed version of the GUI 1409. As such, the GUI 2000 may include many of the same elements as the initial GUI 1409 as shown. The GUI 2000 may also include a list 2005 of the other recurring appointments selected by the user via the GUI 1900. Note that each listed appointment as appearing on the GUI 2000 may be accompanied by a respective remove selector 2010 to remove the respective appointment adjacent to the respective selector 2010 (on the same line) and hence cancel that single appointment while continuing to reserve the other recurring appointments.

Then once the user has selected appointments as desired, the user may select the selector 2015 to continue to reserve the appointments themselves in the AQMS. For instance, responsive to selection of the selector 2015, the AQMS/app may present the GUI 1600 described above for the user to proceed therefrom as already described above (e.g., save for the GUI 1700 in this example presenting the recurring meetings on the confirmation page rather than the single meeting as previously described in reference to FIG. 17).

Proceeding now in reference to FIG. 21, note that in addition to or in lieu of presenting the GUI 1700 through the user's Internet browser or dedicated local app instance (in response to selection of the selector 1635 and/or validation of the info by the AQMS server(s)), the AQMS may send a confirmation email of the user's scheduled appointment(s) to the email address that the user entered into field 1630 so that the user receives an email confirmation of the scheduled LPOE arrival(s) at the user's email account. FIG. 21 therefore shows an example email 2100 that may be sent to the user and presented at the user's client device.

As shown in FIG. 21, the email 2100 includes a subject/title 2101 indicating that a new appointment has been scheduled and indicating the appointment time(s) themselves. The subject line 2101 may also indicate the lane number(s) for each respective appointment.

Email address information 2105 for the sender and recipient may also be included in the email 2100. FIG. 21 also shows that the email body 2110 includes a confirmation message 2115 that the arrival(s) have been scheduled. As also shown, the body 2110 also indicates the name 2115 of the user, the arrival window and traveler program (SMARTlane here) 2120, the appointment date and time 2125 (and arrival window), and the location 2130 of the portion of entry. A thank you message 2135 may also be presented, if desired.

Also if desired, the email 2100 may include selectors 2140-2150. The selector 2140 may be selectable to command the AQMS to initiate a change or cancellation of the appointment(s), which may also prompt the AQMS/app to present the GUI 1409 again for rescheduling. The selectors 2145, 2150 may be selectable to automatically add a calendar entry for the appointment along with the appointment's information to the user's personal digital calendar as already linked to the user's client device (the different selectors 2145, 2150 being presented for different calendars/calendar types).

A calendar appointment attachment 2155 may also be attached to the email 2100. The attachment 2155 may therefore be downloadable to the user's client device and opened to, without additional user input, auto-add the appointment as a calendar entry into the user's electronic calendar(s), complete with much or all of the information from the email body 2110 itself without the user having to re-enter it to the calendar for the calendar entry that is being created.

Figure 22:
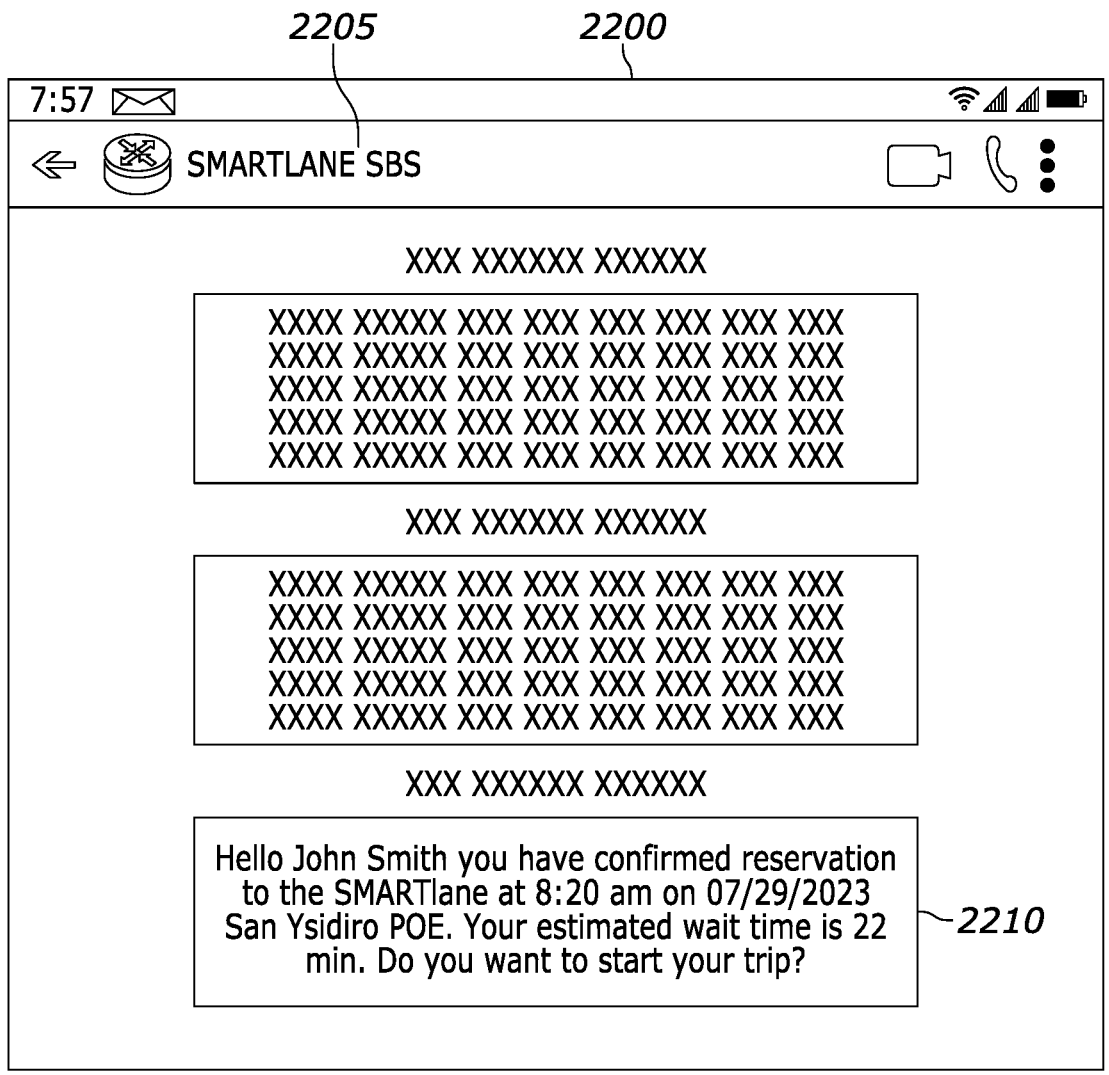
FIGS. 22 and 23 show a text message chain of a text message communication that may be used to book an arrival time through the AQMS consistent with present principles.

Now in reference to FIG. 22, in addition to or in lieu of presenting the GUI 1700 and/or email 2100 (in response to selection of the selector 1635 (and/or validation of the info by the server(s)), the AQMS may send a confirmation short message service (SMS) text message or multimedia messaging service (MMS) message of the user's scheduled appointment(s) to the phone number that the user entered into field 1625. This may be done so that the user receives a telephone text message confirmation at the user's smartphone. FIG. 22 therefore shows a text message 2200 that may be sent to the user's mobile telephone.

As shown in FIG. 22, the text message 2200 indicates the sender 2205 of the text message as well as a text message body 2210. The body 2210 indicates the user's name and includes a confirmation message confirming the user's scheduled appointment. The body 2210 may also other data, including the arrival window and traveler program (SMARTlane here), the appointment date and time (and arrival window), and the location of the port of entry. The text message body 2210 may also indicate an estimated wait time should the user arrive at the scheduled time. The body 2210 may also include a prompt at the end as shown, where the prompt indicates "Do you want to start your trip?"

Figure 23:
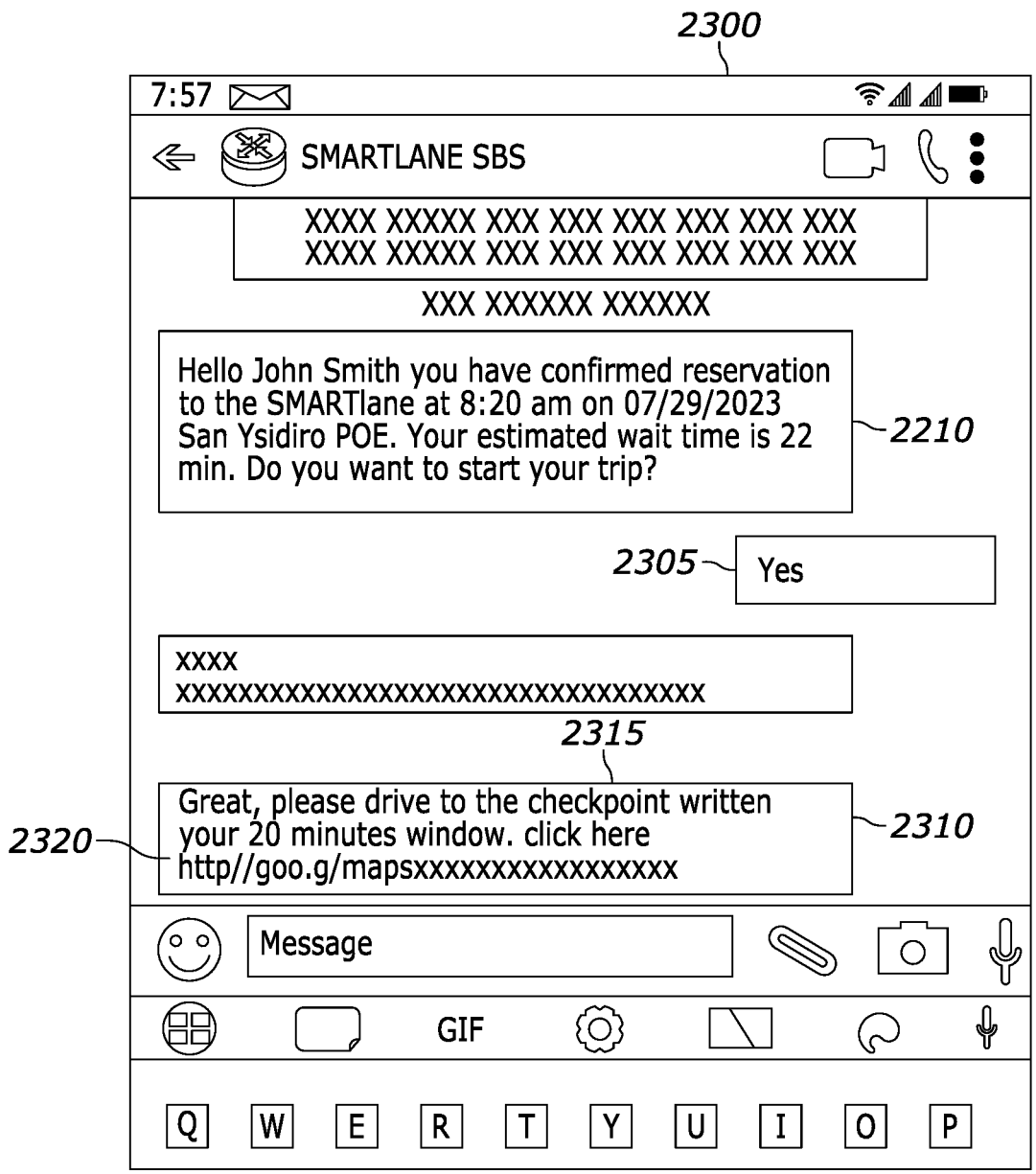

Then, as shown in FIG. 23, the user may send a response of "yes" back to the phone number/text message sender, resulting in a message chain 2300 being established. The message chain 2300 may therefore include both the text message 2210 as well as the user's response text message 2305. In response to receiving the user's text message 2305, the sender of the message 2200 may then send another text message 2310 in response.

As shown in FIG. 23, the message 2310 may include a prompt 2315 instructing the user to "please drive to the Checkpoint within your 20-minute window" as well as "click here" instructions. The "click here" instructions may reference a hyperlink 2320 also presented as part of the message 2310. The hyperlink 2320 may be selectable to command the user's client device to, without further user input, autonomously navigate to a maps website indicated in the hyperlink to begin auto-receiving global positioning system (GPS)-guided directions to the land port of entry itself (and possibly to the entry particular lane to which the user has been assigned for his/her appointment). Thus, the hyperlink 2320 may link not only to the maps website but may be encoded with the user's destination address/specific lane coordinates themselves.

Additionally or alternatively, note that the hyperlink 2310 may also be selectable to command the user's client device to, without further user input, autonomously auto-launch a separate maps app stored at the user's client device so that the user can similarly navigate to the land port of entry but via the maps application. Thus, here too the maps app may use the destination address/coordinates coded into the hyperlink 2310 to identify and help the user navigate to the destination.

Figure 24:
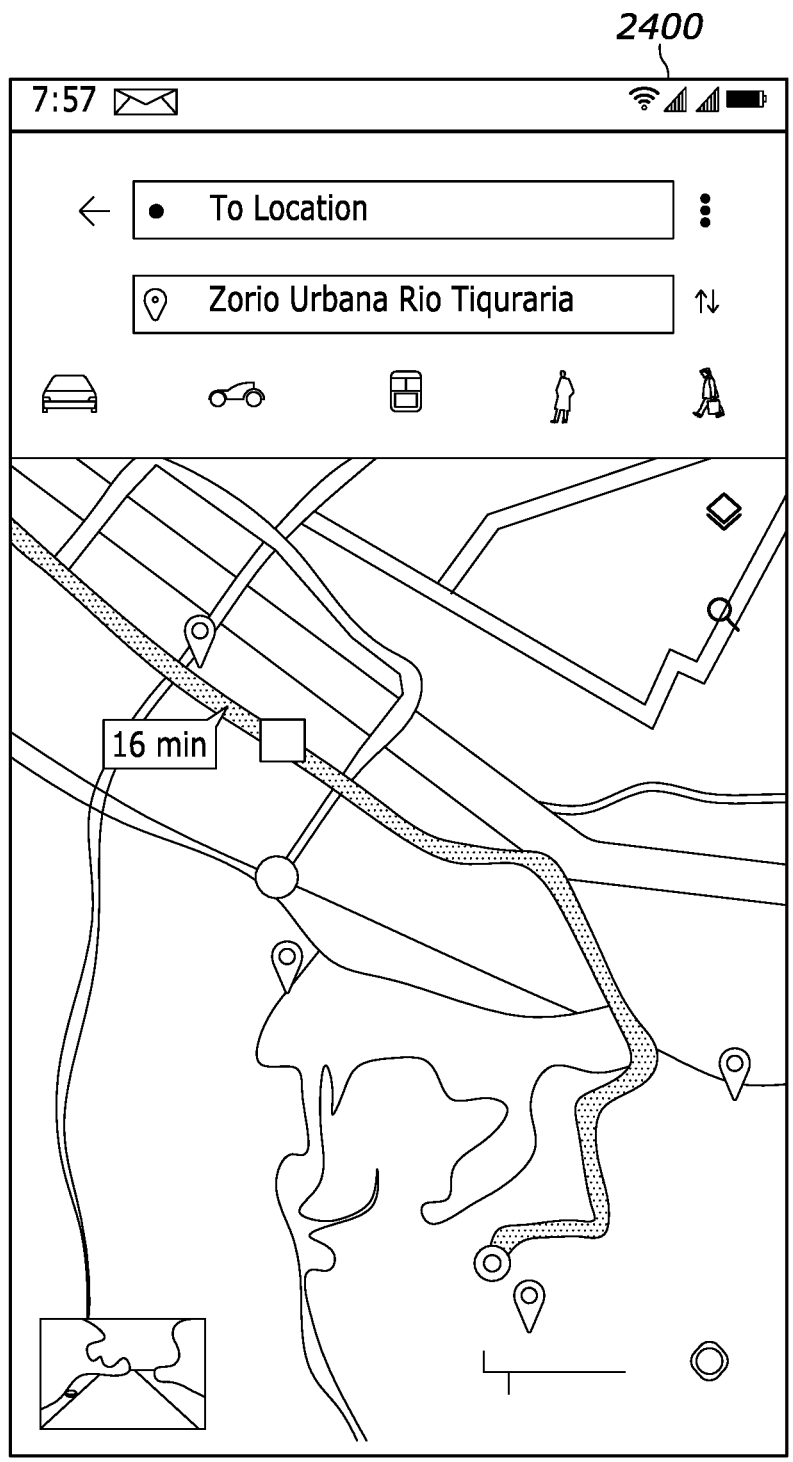
FIG. 24 shows an example GUI that may be presented for a user to navigate to a designated entry lane for an arrival booked through the AQMS consistent with present principles.

FIG. 24 then shows an example GUI 2400 of the maps app or Internet browser-based maps website as presented on the display of the user's client device. The user may thus drive, walk, etc. to the destination using the GUI 2400 as it updates in real time as the user physically moves along the route to the destination.

Figure 25:
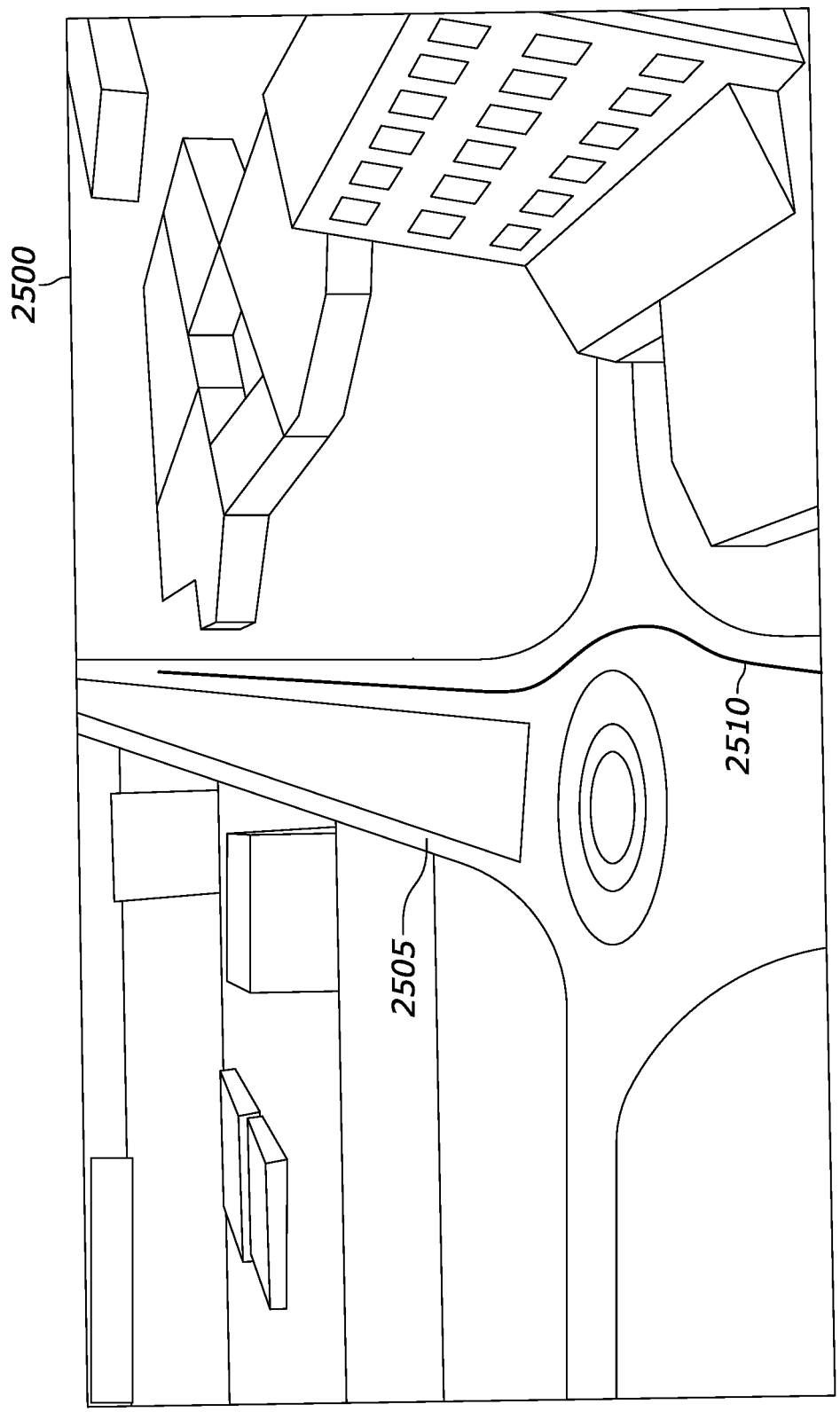
FIG. 25 shows a real-life arial view GUI that may be presented via the AQMS dedicate app consistent with present principles.

FIG. 25 shows a real-life arial view GUI 2500 that may be presented via the AQMS dedicate app (an instance of which is stored at and executing on the user's client device), and/or that is presented via the maps service itself. The arial view 2500 may be a digital photograph or other image taken using a satellite, arial drone, etc. As shown, the arial view 2500 indicates an immediate road 2205 down which the user is to travel, as well as a graphical indication 2510 that is graphically superimposed over the arial view. The indication 2510 may indicate the recommended path/route the user is to travel to reach the destination to aid the user in navigating thereto.

Figure 26:
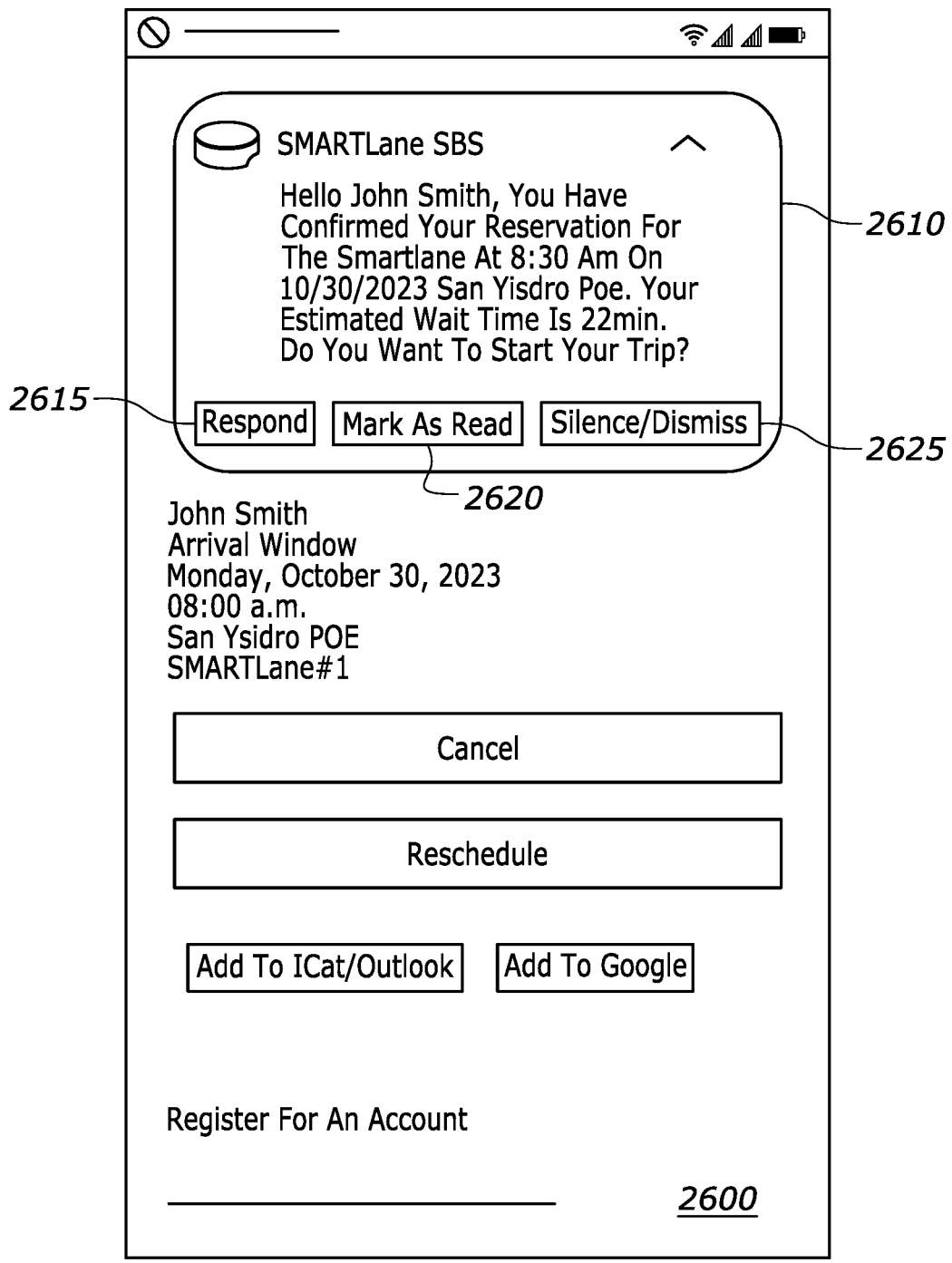
FIG. 26 shows a GUI with a banner/pop-up notification that may be presented to an end-user responsive to completion of the AQMS booking process consistent with present principles.

Continuing the detailed description in reference to FIG. 26, another aspect consistent with present principles is shown. Here, assume the user has proceeded through the booking process of FIGS. 14a-20 (and hence scheduled/confirmed an appointment to cross a land port of entry) through a dedicated AQMS app, an instance of which is stored locally at the user's client device. As such, a GUI 2600 similar to the GUI 1700 may be presented on the client device's display as part of the AQMS app. Additionally, a banner/pop-up notification 2610 may be presented on the mobile device's display responsive to completion of the booking process. The content of the notification 2610 may be the same as the content of the text message body 2210 described above.

The notification 2610 may also include a respond selector 2615, which may be selected to open a message chain within the AQMS app itself so that the user can respond "yes" and receive a follow-up message within that message chain. The follow-up message may be the same as the message 2310 and, as such, may include a hyperlink similar to the hyperlink 2320. As also shown in FIG. 26, the notification 2610 may include a "mark as read" selector 2620 to mark the notification 2610 as read. In response to selection of the selector 2620, the app may remove the notification 2610 from presentation on the display and mark the notification 2610 as read in the message/notification center of the AQMS app itself.

Still further, the notification 2610 may include a silence/dismiss selector 2625. The selector 2625 may be selected to command the app to remove the notification 2610 from presentation on the display but to leave the notification 2610 marked as unread in the message/notification center of the AQMS app itself.

Figure 27:
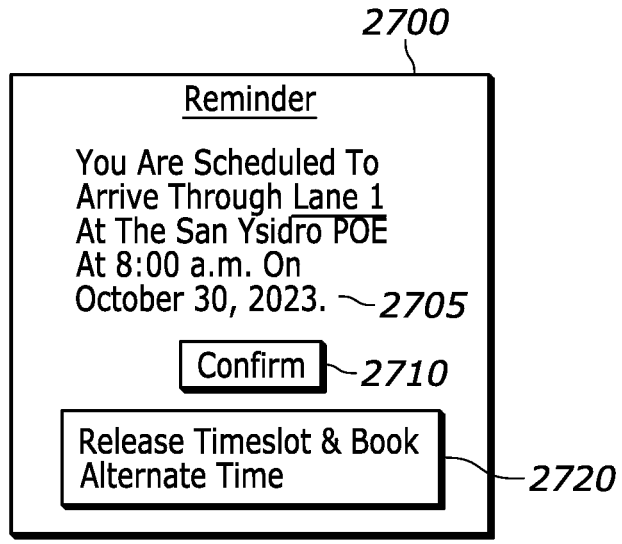
FIG. 27 shows a GUI providing a reminder of an upcoming AQMS-scheduled arrival time consistent with present principles.

Continuing now in reference to FIG. 27, at a user-designated or administrator-designated threshold time before the user's scheduled arrival time, a GUI like the GUI 2700 may be presented. The threshold time may be one-day prior to the scheduled arrival time, thirty minutes prior to the scheduled arrival time, or another user-configurable amount of time prior to the scheduled arrival time. Additionally, note that the GUI 2700 itself may be presented through a web-based interface for the AQMS as accessed through an Internet browser, through an SMS or MMS text message, and/or through the dedicated AQMS app executing at the user's mobile device.

As shown in FIG. 27, the GUI 2700 may include a prompt 2705 reminding the user that the user is scheduled to arrive through Lane 1 at the San Ysidro port of entry at the user's selected date and time (still 8:00 a.m. PST on Oct. 30, 2023 per this example). The GUI 2700 may also include a confirm selector 2710 that may be selectable to not only dismiss the GUI 2700 but send an electronic confirmation message to the AQMS server(s) so that the server(s) may maintain the user's scheduled arrival.

As also shown in FIG. 27, the GUI 2700 may include a "release timeslot and book alternate time" selector 2720. The selector 2720 may therefore be selectable once to both command the AQMS server(s) to cancel the user's scheduled appointment (and hence release the user's designated arrival time slot available to others for booking, including last-minute bookers), and to command the user's device/AQMS app to present the GUI 1409 of FIG. 14C again so that the user may reschedule the appointment.

Figure 28:
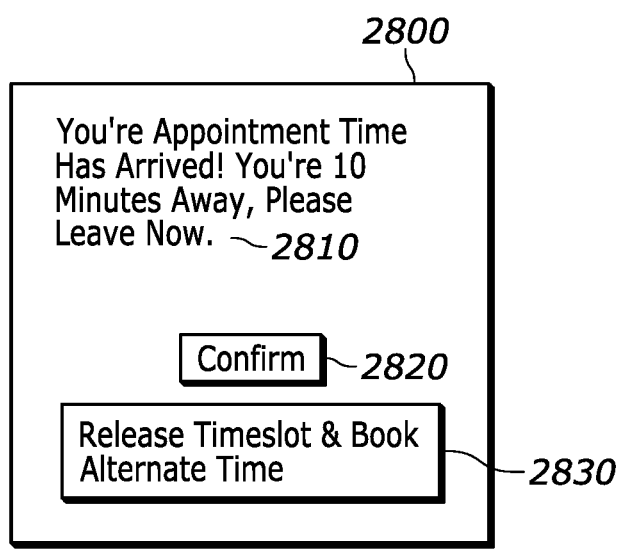
FIG. 28 shows a GUI indicating that the user's arrival time for an AQMS-scheduled arrival has been reached consistent with present principles.

Turning now to FIG. 28, suppose the user is already late to his/her scheduled appointment, or that the user is estimated to be late to the appointment based on average speed, current time of day, current GPS location, and distance left to travel to the destination. Responsive to either one, the GUI 2800 of FIG. 28 may be presented.

As shown in FIG. 28, the GUI 2800 may include a prompt 2810 indicating that the user's appointment time has arrived and that the user is ten minutes commute time away, further advising the user to start proceeding toward the designated arrival location forthwith. The GUI 2800 may also include a confirm selector 2820 that may be selectable to not only dismiss the GUI 2800 but to send an electronic confirmation message to the AQMS server(s) so that the server(s) may maintain the user's scheduled arrival for the user. The confirm selector 2820 may also be selectable to launch a maps app that may then begin auto-providing directions to the user's destination without further user input other than the single selection of the selector 2820 itself.

As also shown in FIG. 28, the GUI 2800 may include a "release timeslot and book alternate time" selector 2830. The selector 2830 may therefore be selectable once to both command the AQMS server(s) to cancel the user's scheduled appointment (and hence release the user's designated arrival time slot available to others, including last-minute bookers) and to command the user's device/AQMS app to present the GUI 1409 of FIG. 14C again so that the user may reschedule the appointment.

Figure 29:
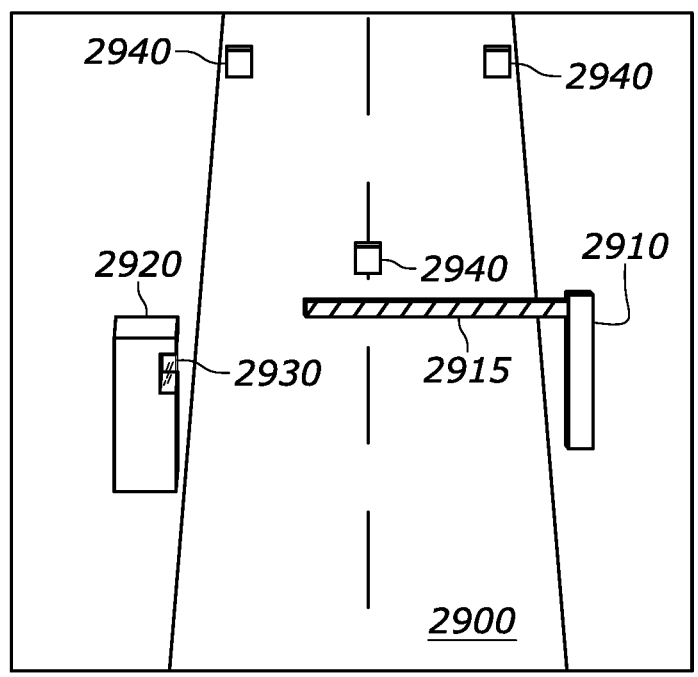
FIG. 29 shows a perspective view of an entry point and kiosk that may be used to enter a lane booked through the AQMS consistent with present principles.

Continuing now in reference to FIG. 29, suppose a user has arrived at the entry point to the user's designated lane to cross the land port of entry according to the user's appointment. This is illustrated in FIG. 29, and as such the figure shows a lane 2900 and boom barrier 2910 with movable arm 2915 to block or permit entry to the lane 2900 beyond the barrier 2910 itself. The arm 2915 may thus rotationally pivot up to permit access to downstream portions of the lane 2900, and rotationally pivot down to block access to the downstream portions. The arm 2915 may be moved using a motor and linkage within the barrier 2910, with the motor/linkage itself being electronically controllable via a lane kiosk 2920 and/or the remotely-located AQMS server(s). Note that the kiosk 2920 that is shown includes an electronic, touch-enabled display 2930.

As also shown in FIG. 29, juxtaposed at different areas of the lane 2900 downlane of the boom barrier 2910 may be one or more lane traffic sensors 2940 mounted on the horizontal surface of the lane 2900, on sidewalls/curbs of the lane 2900, and/or on a roof or other structure above the lane 2900. The sensors 2940 might be RFID sensors, cameras, etc. as described elsewhere herein to thus sense/monitor an amount of lane traffic and/or congestion in the lane 2900 based on one or more real-time measurements of traffic flow from the sensors 2940 themselves.

Figure 30:
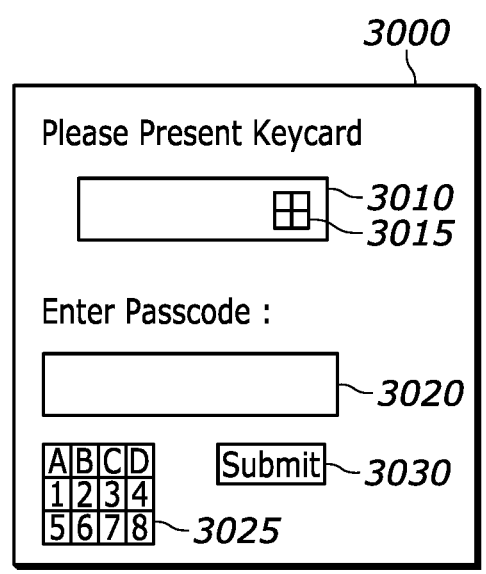
FIGS. 30-32 show GUIs that may be presented on the display of the kiosk of FIG. 29 consistent with present principles.

Turning to FIG. 30, this figure shows an example GUI 3000 that may be presented on the display 2930 of the kiosk 2920. The GUI 3000 may be presented responsive to detecting the scheduled user as arriving. Detecting the scheduled user as arriving may be determined, for example, responsive to receipt of one or more RFID signals sent from an active RFID transponder on the user's vehicle, where those signals indicate a unique user identifier. The GUI 3000 may additionally or alternatively be presented based on the user touching the display 2930, and/or based on another trigger such as input from a vehicle sensor underneath the pavement. In terms of the aforementioned RFID transponder on the user's vehicle, note that each user/vehicle may arrive with an access device (e.g., RFID transponder) with a unique identifier number encrypted and stored therein. The encrypted identifier may be wirelessly transmitted to the kiosk 2920 for decryption, where authorized identifiers provide an access right governed by the AQMS to properly trigger the entry barrier at the respective entry point (and at the respective scheduled arrival time) for the barrier to raise or otherwise open to provide the respective user entry to the lane 2900. Asymmetric key encryption with a public/private key pair may be used for such purposes.

When the user arrives at the land port of entry, as an added layer of digital security beyond the RFID transponder on the user's vehicle, the user may also reach out of the driver's side window of his/her vehicle to present a (different) RFID keycard or other electronic ID card with another user identifier that may also be wirelessly transmitted to the kiosk 2920 (e.g., using passive or active RFID). A graphic 3010 of an example keycard with RFID chip 3015 may therefore be included on the GUI 3000 to help prompt the user. Additionally or alternatively, another user identifier in the form of a passcode (equivalently, password) may be entered into input box 3020 using a soft keypad 3025 or even a hard keypad (not shown).

The user may then select the submit selector 3030 to submit the passcode identifier and/or RFID keycard identifier. In response, the kiosk 2920 and/or AQMS server(s) may then present the GUI 3100 shown in FIG. 31. Or the kiosk 2920/AQMS servers might even skip presentation of the GUI 3000 and proceed directly to presenting the GUI 3100 (e.g., if the appropriate identifier is received from the user's RFID transponder and/or keycard).

Figure 31:
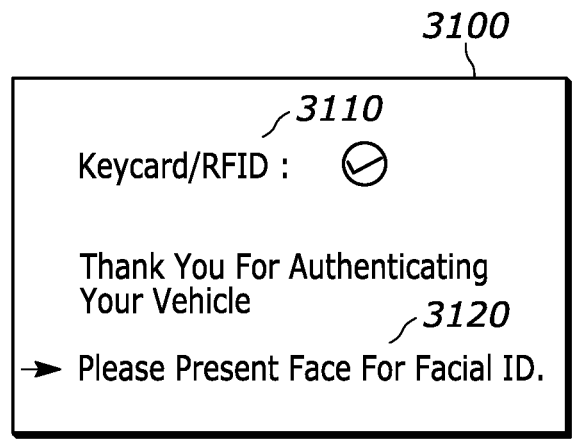

In any case, as shown in FIG. 31, the GUI 3100 may include an indication 3110 in the form of text and a graphical icon (e.g., green check mark) that both indicate that the user's identifier (e.g., via keycard or RFID transponder) has been authenticated. As also shown, the indication 3110 may also thank the user for authenticating themselves and/or the user's vehicle. Additionally, in some examples as an additional layer of digital security (and to possibly expedite government processing of the user once the user reaches the front of the queue), the GUI 3100 might also include a prompt 3120 for the user to present the user's face to a camera on the kiosk 2920 (e.g., just above the display 2930 and facing the user) for facial identification. Other forms of biometric authentication may also be used, including for example voice identification based on the user speaking into the microphone on the kiosk 2920, fingerprint identification based on the user providing a fingerprint to a fingerprint reader on the kiosk 2920, iris recognition using the kiosk's camera, etc.

Figure 32:
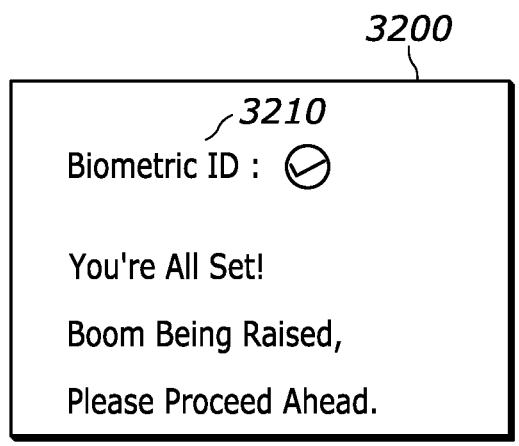

Then, once user presents his/her face for facial recognition or otherwise provides biometric input to biometrically authenticate the user, the GUI 3100 may be removed from the display 2930. The GUI 3200 of FIG. 32 may then be presented in response to the biometric authentication. As shown in FIG. 32, the GUI 3200 includes an indication 3210 in the form of text and a graphical icon (e.g., green check mark) that both indicate that the user has been biometrically authenticated.

As also shown in FIG. 32, the indication 3210 may also indicate that the user is authorized to proceed down the designated lane (e.g., assuming the user has also promptly arrived within the user's designated arrival time window). As such, the indication 3120 may also indicate that the boom/arm 2915 is being raised and that the user may proceed down the user's designated lane.

Figure 33:
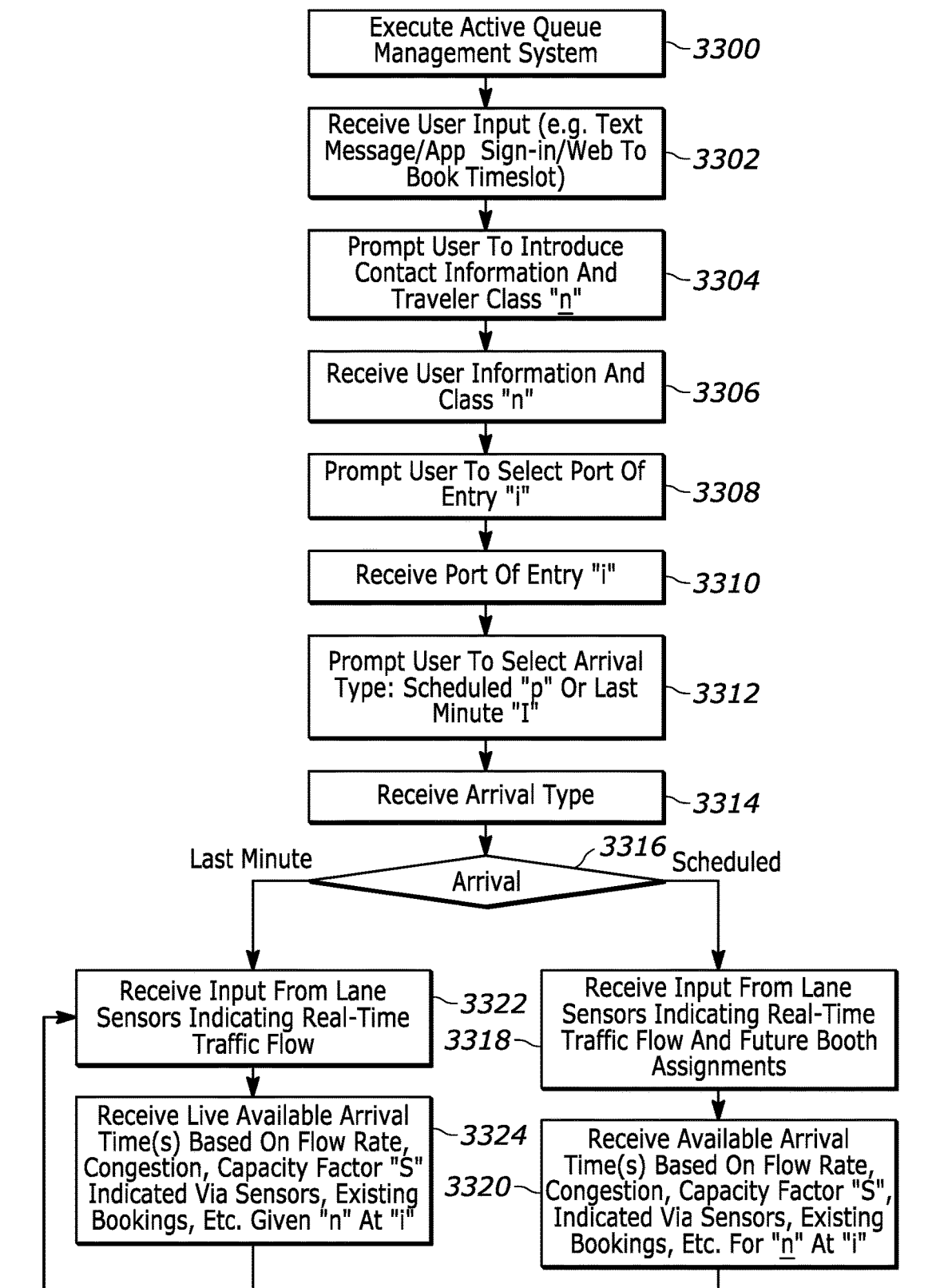
FIG. 33 shows a flow chart of example user experience logic that may be executed by one or more devices consistent with present principles.
Figure 33:
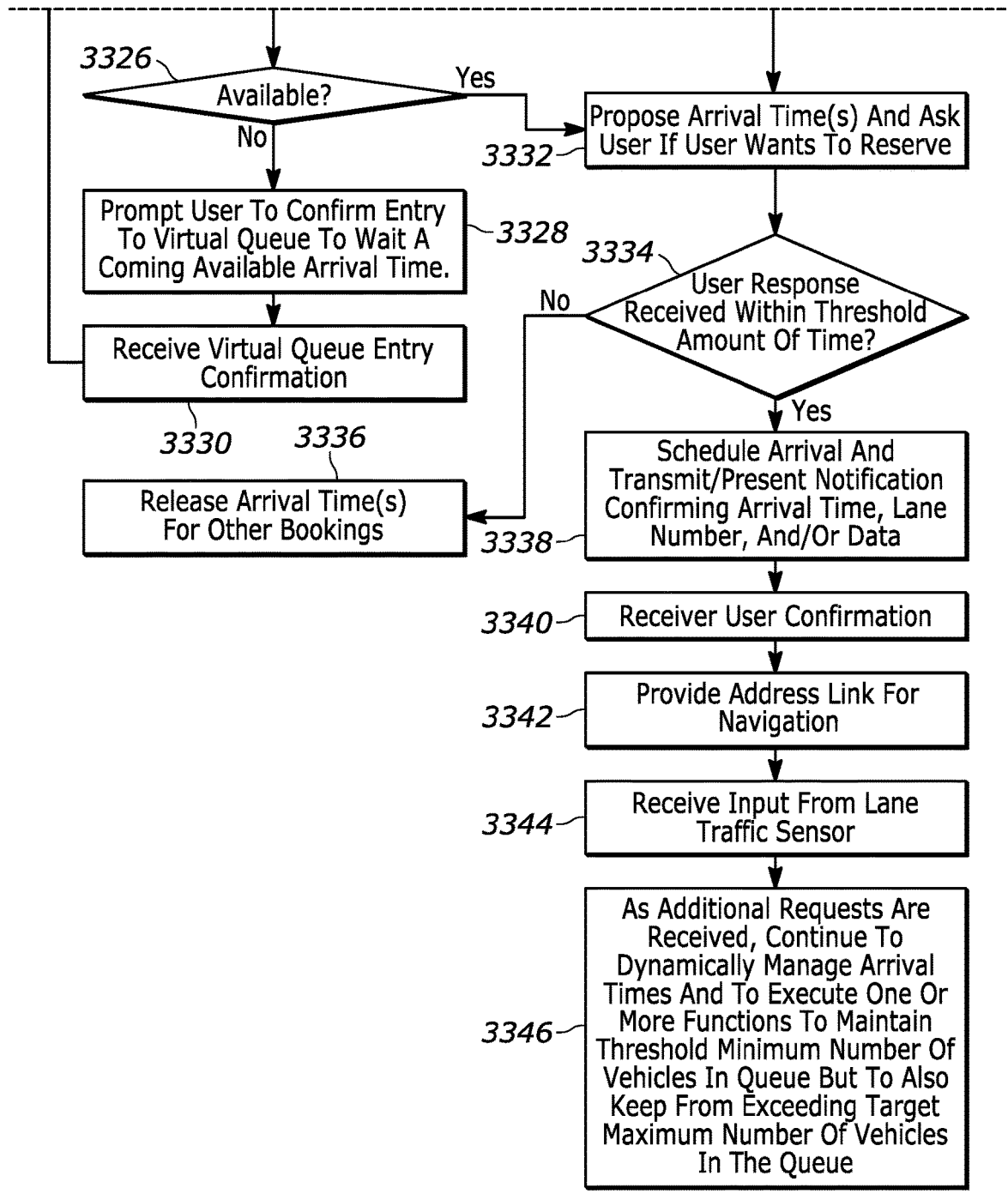

Referring now to FIG. 33, it shows example user experience logic that may be executed by one or more servers/a server processor assembly consistent with present principles. Additionally or alternatively, one or more steps in the logic may be performed by a client device alone or in concert with the server/server processor assembly. The client device might be a smartphone, laptop computer, headset, or other device through which an end-user can book an arrival/appointment using the AQMS. Note that while the logic of FIG. 33 is shown in flow chart format, other suitable logic may also be used.

Beginning at block 3300, the device may execute an Active Queue Management System consistent with present principles. This might include launching and continually executing back-end server logic/software at the server(s), executing an AQMS app at the client device, and/or monitoring for user inputs to the system (including user appointment scheduling inputs and as well as kiosk inputs once the users get to their entry points). From block 3300 the logic may then proceed to block 3302.

At block 3302 the device may receive user input at/from the user's client device. Specifically, the user input may have been provided to the user's client device through the dedicated client-side app, a web-based Interface, and/or SMS-based text message chain. The input may be transmitted from the client device to the AQMS server for receipt at the server.

From block 3302 the logic may then proceed to block 3304. At block 3304, the device(s) may prompt the user to provide contact information and an indication of his/her traveler class. The travel class is generally designated traveler class "n" and might be, for example SENTRI, Ready Lane, or another class. From block 3304 the logic may then proceed to block 3306, where the contact information and traveler class "n" may be received from the client device/user. The logic may then proceed to block 3308.

At block 3308 the device(s) may prompt the user to select a desired port of entry "i" through which to cross an international border (it being reiterated that present principles may also be used for admission to sporting events, concerts, going through security and/or customs at airports, etc.). Then at block 3310 the user's specified port of entry "i" may be received. The logic may then proceed to block 3312.

At block 3312, the device(s) may prompt the user to select an arrival type, such as a scheduled arrival "p" or last-minute arrival "l". Then at block 3314 the user's arrival type may be received, after which the logic may proceed to decision diamond 3316.

At decision diamond 3316 the device(s) may determine, based on receipt of the arrival type at block 3314, whether the arrival type is a scheduled arrival or last-minute arrival. Responsive to a determination that the arrival type is a scheduled arrival, the logic may then proceed to block 3318 where the device(s) may receive input from one or more lane sensors (such as one of more of the sensors 2940 described above) that indicate real-time traffic flow. Also at block 3318, the device(s) may receive input on future booth assignments, e.g., as input by a system administrator or other admin-level user.

Thereafter, the logic may proceed to block 3320 where the device(s) may determine (in the case of a server) and/or receive (in the case of a client device receiving the arrival time data from the server) one or more available arrival times based on flow rate, congestion (e.g., as determined from flow rate), and current capacity factor "S" as indicated via the lane sensors. Also at block 3320, the device(s) may access scheduling data maintained at the server to identify/receive existing bookings and other data for the traveler class "n" at the port of entry "i" for one or more future times of day. From here the logic may then proceed to block 3332 as will be described shortly.

However, first reference is made back to decision diamond 3316. Responsive to a determination that the arrival type is a last-minute arrival instead, the logic may move from decision diamond 3316 to block 3322. At block 3322 the device(s) may receive input from one or more lane sensors (such as one of more of the sensors 2940 described above) that indicate real-time traffic flow. Thereafter the logic may proceed to block 3324 where the device(s) may determine (in the case of a server) and/or receive (in the case of a client device receiving the arrival time data from the server) one or more live, currently-available arrival times for the current time of day up until a future threshold amount of time, such as twenty minutes in the future from the current time of day. The live arrival times may be based on flow rate, congestion (e.g., as determined from flow rate), and current capacity factor "S" as indicated via the lane sensors. Also at block 3324, the device(s) may access scheduling data maintained at the server to identify/receive existing bookings and other data for the traveler class "n" at the port of entry "i" for the current time of day. From here the logic may then proceed to decision diamond 3326.

At diamond 3326 the device(s) may determine whether one or more timeslots for the current time of day, for traveler class "n" at port of entry "i", is currently available for the present time of day. This may be based on, inter alia, congestion and current bookings and other factors discussed above. A negative determination at diamond 3326 (e.g., no capacity for another arrival) may cause the logic to proceed to block 3328 where the device(s) may prompt the user via a GUI/message to confirm entry into a virtual queue maintained at the server so that the user can wait for a coming available arrival time in the future instead, where that arrival time might not be a scheduled future time per se but a waiting list for the user to be notified when the AQMS dynamically determines at an indeterminate time in the future that an arrival time is currently available. The logic may then proceed to block 3330 where confirmation from the user is received that the user desires to enter the virtual queue. Thereafter the logic may move to block 3322 to proceed again therefrom, to dynamically determine on loop or at a preset time interval whether one or more timeslots for the current time of day, for traveler class "n" at port of entry "i", is currently available for the present time of day (so that, when one becomes available, the user may be notified).

Thus, referring back decision diamond 3326, when one or more timeslots for the current time of day, for traveler class "n" at port of entry "i", are determined to be currently available for the present time of day, the logic may proceed to block 3332.

Describing block 3332, again note that this block may be arrived at either from block 3320 for a future/scheduled arrival, or responsive to an affirmative determination at diamond 3326 for a last-minute/immediate arrival at the land port of entry "i". At block 3332, the device(s) may propose/present the determined arrival time(s) to the user (e.g., via a GUI like the GUI 1409) and ask the user if the user wants to reserve one of the determined arrival time(s). While the device awaits a user response, the device may keep the proposed times reserved so that they cannot be booked by other end-users.

The logic of FIG. 33 may then proceed to decision diamond 3334. At diamond 3334 the device(s) may determine whether a user response to the AQMS proposal or arrival time(s) has been received (e.g., at least within threshold amount of time of the times themselves being proposed to the user). Responsive to a negative determination at diamond 3334, the logic may proceed to block 3336 where the device(s) may release the proposed times for booking by others based on nonresponse from the user within the threshold amount of time. However, responsive to an affirmative determination at diamond 3334, the logic may instead proceed to block 3338.

At block 3338 the device may, responsive to user acceptance of a proposed time, schedule the user's arrival and transmit/present notification(s) to the user confirming the arrival time, lane number, and/or other data. The logic may then proceed to block 3340 where the device may receive user confirmation of the booked timeslot and then proceed to block 3342 where the device may provide an address link for navigation by the user to the user's designated lane. For example, at block 3342 one of the hyperlinks mentioned above may be provided according to the descriptions above.

After block 3342 the logic may move to block 3344 where the device may, in real time, receive input from the lane traffic sensors that are monitoring lane traffic (e.g., again, such as one or more of the sensors 2940) to execute the step of block 3346. Accordingly, at block 3346, as additional requests are received, the device(s) may continue to dynamically manage arrival times and to execute one or more functions to maintain a threshold minimum number of vehicles in queue if possible (e.g., the threshold being set by a system admin and being greater than one, for example), but to also keep from exceeding a target maximum number of vehicles in the queue according to principles set forth herein.

Figure 34:
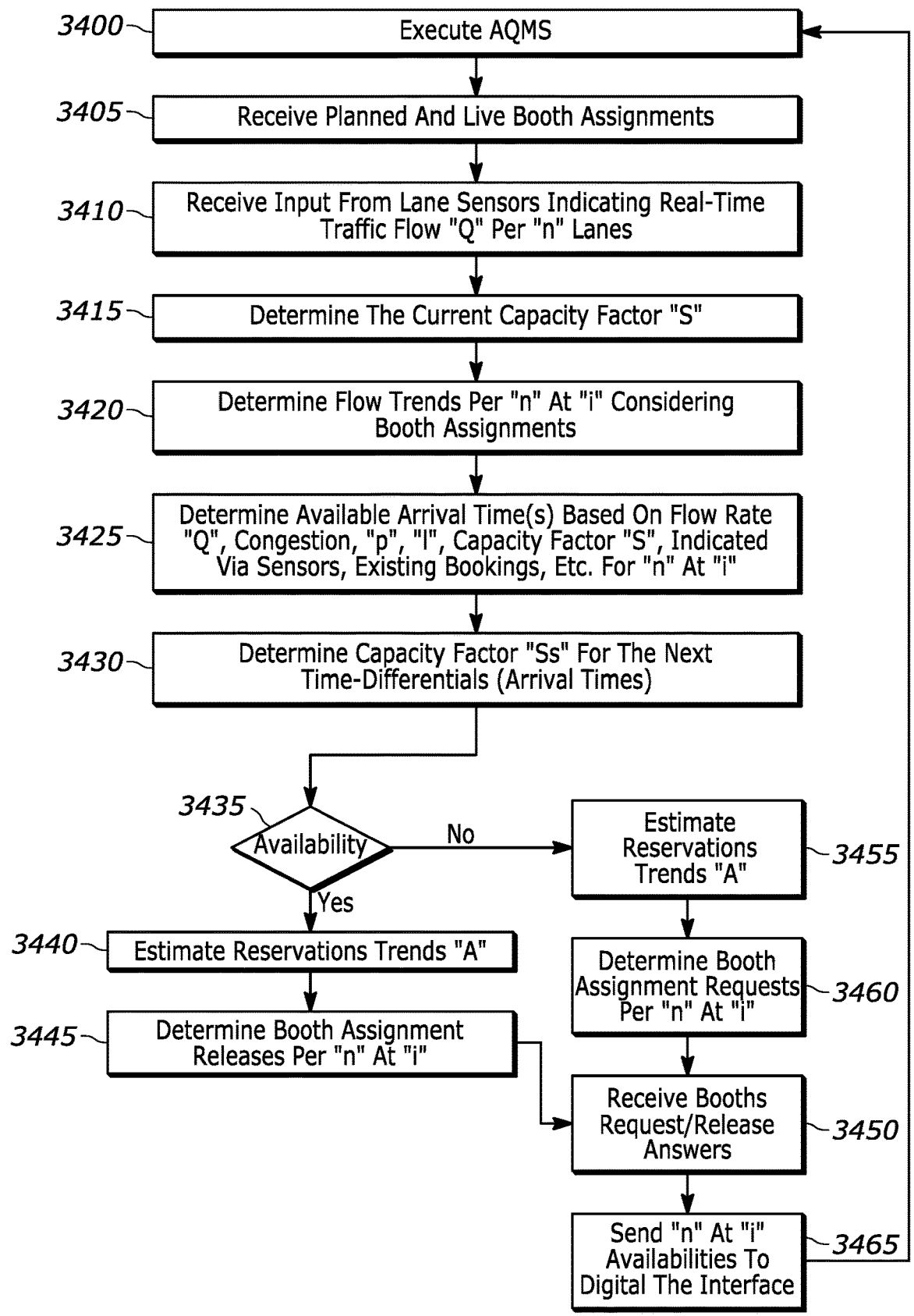
FIG. 34 shows a flow chart of example LPOE operator device logic that may be executed by one or more devices consistent with present principles.

Now in reference to FIG. 34, it shows example LPOE operator device logic that may be executed by one or more servers/a server processor assembly consistent with present principles. Additionally or alternatively, one or more steps in the logic may be performed by a client device alone or in concert with the server/server processor assembly. The client device might be that of a government official or government agency managing a LPOE consistent with present principles. Note that while the logic of FIG. 34 is shown in flow chart format, other suitable logic may also be used.

Beginning at block 3400, the device may execute an Active Queue Management System consistent with present principles. This might include launching and continually executing back-end server logic/software at the server(s), executing an AQMS operator app at the client device (e.g., different than the end-user app through which individual arrivals may be booked), and/or monitoring for user inputs to the system as discussed below. From block 3400 the logic may then proceed to block 3405.

At block 3405 the device(s) may receive planned (future) and live (current) booth assignments through a LPOE operator GUI. The booth assignments may indicate booths open/expected to be open, as well as respective human officials who are to occupy each booth, recognizing as mentioned above that different LPOE officials might process arriving people/individual arrivals at different rates. If desired, a history of past processing rates for each official may also be accessed at block 3140 to determine an average processing time at which each official processed people in the past so that the average time may be used for estimating flows through the official's current or future booth assignment. Those average times themselves might have been determined using lane sensors (such as those described above, e.g., a camera with objection recognition) and then saved by the AQMS at the AQMS server(s) as part of the history. The AQMS may thus use the sensors to count each vehicle/person that passes through and how long each one takes before being permitted entry through the LPOE to then calculate an average time for the respective official assigned to that booth during the relevant time.

From block 3405 the logic may then proceed to block 3410. At block 3410 the device(s) may receive input from the lane sensors mentioned above. The input may indicate a real-time, current traffic flow "Q" for "n" lanes (for a particular traveler class, reiterating that particular traveler classes may be assigned different respective lanes/queues at the LPOE).

From block 3140 the logic may then proceed to block 3415. At block 3415 the device(s) may determine the current capacity factor "S" considering current flow rates, and pending arrivals of the current batch. This capacity factor may be thought of like a safety factor in some instances, and it may have two purposes. First, it allows for room (additional capacity) to absorb real-time changes on clearance rates from Customs without affecting the upcoming arrival batch after the current one, since otherwise (e.g., if all capacity was booked for the current moment/arrival time window), the next batch may experience a different pace affecting the wait times. Second, it permits management of well-ahead (scheduled) reservations, enabling the offering of a limited amount of reservations and releasing more near the respective date/time (e.g., releasing more for last-minute arrivals). The capacity factor itself may be introduced by a human, or determined as part of the rules-based algorithm and/or machine learning.

The logic may then proceed to block 3420 where the device(s) may determine flow trends per "n" at "i" consistent with present principles, while accounting for booth assignments (e.g. the average processing time for that booth's current official as described above). With flow trends determined, the logic may then move to block 3425 where the device(s) may determine available arrival time(s) based on the flow rate "Q", current congestion, "p", "I", current capacity factor "S" (e.g., as indicated via the lane sensors), and existing bookings/currently-booked arrival times, etc. for "n" at "i". The logic may then proceed to block 3430.

At block 3430 the device(s) may determine the capacity factors "S(s)" for the next time-differentials (arrivals times t+1, t+2, etc.) considering the current capacity factor, and future arrivals. Then, the logic may then proceed to decision diamond 3435 to determine if there is availability for other scheduled or last-minute arrivals based on the current capacity factor "S" and the following/later capacity factors determined at block 3430 (e.g., availability where the current capacity factor is less than the following/later capacity factor(s)). In this way, the AQMS may determine the current level of saturation of the relevant lane, and also estimate the capacity factor for the next arrival batch. So, for example, if the relevant lane is already full/saturated, the AQMS may diminish the capacity factor for the next/upcoming arrivals offer.

Responsive to an affirmative determination at diamond 3435, the logic may proceed to block 3440 where the device(s) may estimate reservations trends "A" (e.g., average reservation requests per "n" for "i" for a relevant time frame). Then at block 3445 the device(s) may determine booth assignment releases/availability per "n" at "i". Thus, a release/availability indicator may be returned (e.g., indicating available slots for a particular "n" that may be booked, or that no slots are available for last-minute arrivals and/or future arrivals).

Thereafter, the logic may proceed to block 3450 where the device(s) may receive booth requests from end-users (e.g., requests to book an arrival at a LPOE using FIGS. 14a-20 or using SMS text messaging consistent with present principles). Also at block 3450, the device(s) may release answers so that, at block 3465, a notification or other data indicating available timeslots may be sent to the requesting user's client device to indicate available timeslots. Those available timeslots may then be presented to the user as a visual notification at the user's own client device, such a through the GUI of FIG. 14c for example.

Referring back to decision diamond 3435, note that if a negative determination is made instead, the logic may proceed to block 3455 rather than block 3440. At block 3455 the device(s) may estimate reservations trends "A" and then, at block 3460, the device(s) may determine booth assignment requests per "n" at "i". Thus, a release/availability indicator may be returned (e.g., indicating available slots for a particular "n" that may be booked, or that no slots are available for last-minute arrivals and/or future arrivals). Further, if the system does not have availability, it may assess at this step whether to request additional booths considering high-demand trends (and make the request if appropriate). Conversely, if the system determines it has ample availability, the system might instead assess at this step whether to release/close booths due to low-demand (and do so if appropriate). From block 3460 the logic may then proceed to block 3450 as described above, and then to block 3465 as also described above. Note further that however arrived at, from block 3465 the logic may revert back to block 3400 to again execute the logic of FIG. 34 in a continuous loop.

Figure 35:
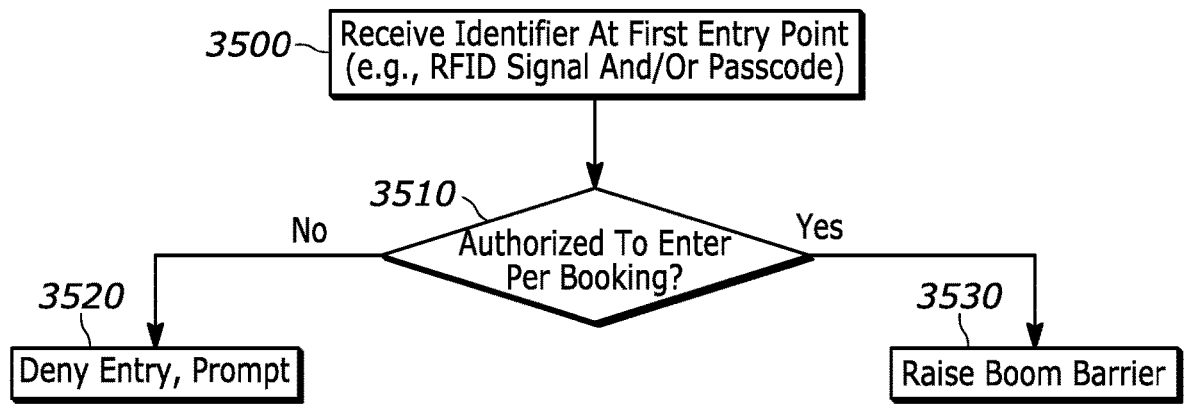
FIG. 35 shows a flow chart of example logic that may be executed to control a kiosk at an entry point to permit an end-user entry into a particular entry lane for which an arrival time has been booked through the AQMS consistent with present principles.

Continuing the detailed description in reference to FIG. 35, it shows example logic that may be executed by one or more servers/a server processor assembly consistent with present principles to operate a kiosk, and/or that may be executed by the kiosk itself (such as the kiosk 2920) alone or in any appropriate combination. Note that while the logic of FIG. 35 is shown in flow chart format, other suitable logic may also be used. The logic of FIG. 35 may be used to permit or deny a user entry to a designated lane based on AQMS scheduling and whether the user arrives on time, for example.

Beginning first with block 3500, the device may receive one or more user identifiers at a first entry point (e.g., RFID signal and/or passcode as described above). From block 3500 the logic may then proceed to decision diamond 3510. At diamond 3510 and consistent with the description above, the device may determine whether the user is authorized to enter the first entry point and hence into the designated AQMS lane. This may be based on whether the user has been properly identified and biometrically authenticated, whether the user has arrived on time or not on time (too early or too late), and other factors as discussed herein.

Accordingly, a negative determination at diamond 3510 may cause the logic to proceed to block 3520 where the device may deny entry to the user and prompt the user to take another action. For example, if the user is too early, the device may prompt the user to come back at the user's scheduled time. If the user is too late, the device may prompt the user to reschedule for another time or proceed to another entry lane not managed by the AQMS system. Or if the user is not biometrically authenticated, the device may prompt the user to try again or to try another form of authentication.

Responsive to an affirmative determination at diamond 3510, the logic may instead proceed to block 3530. At block 3530 the device may send a control command to the boom barrier to raise the boom barrier, or otherwise control whatever other barrier might be used to permit entry to the user's designated entry lane.

Figure 36:
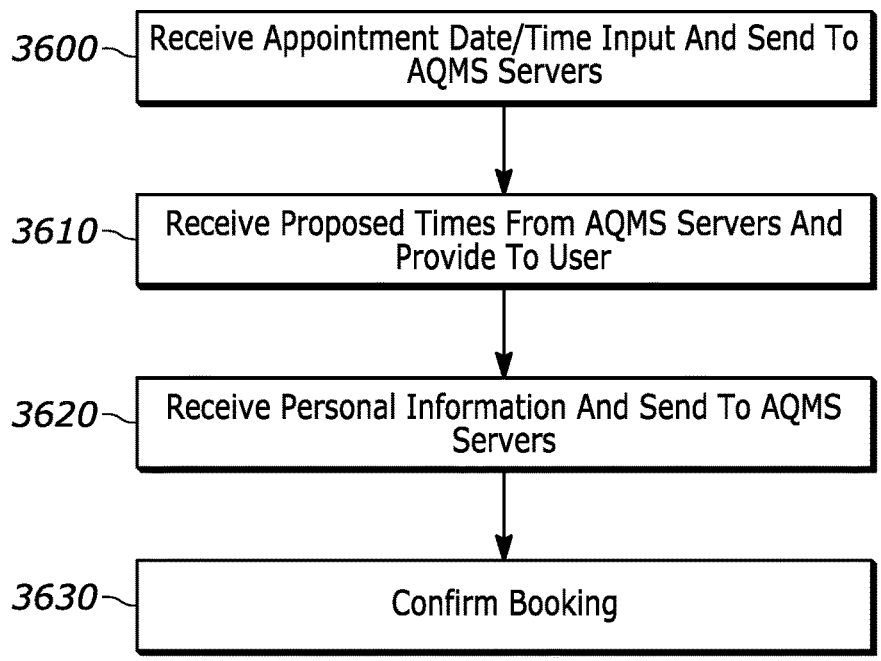
FIG. 36 shows a flow chart of example logic that may be executed by an end-user's client device to make an AQMS booking consistent with present principles.

Now in reference to FIG. 36, it shows example logic that may be executed by an end-user's client device to make an AQMS booking consistent with present principles. So, for example, the logic of FIG. 36 may be executed by a dedicated AQMS app an instance of which is running on the end-user's device. Or the logic may be executed through a web-based interface or portal, or even via text message, in conjunction with the AQMS servers. Note that while the logic of FIG. 36 is shown in flow chart format, other suitable logic may also be used.

Beginning at block 3600, the device may receive appointment date/time input and then send that input to AQMS servers. For example, at block 3600 the input might be received via the GUIs 1409 and 1500 described above. From block 3600 the logic may then proceed to block 3610. At block 3610 the device may receive back from the AQMS servers one or more proposed times and provide/output the proposed times to the user for selection. This might also be accomplished through the GUIs 1409, 1500 as described above.

After block 3610 the logic may proceed to block 3620. At block 3620 the device may receive personal information (e.g., via a GUI like the GUI 1600) and send the personal information to the AQMS servers. Thereafter, the logic may proceed to block 3630 where the device may confirm the user's booking.

Figure 37:
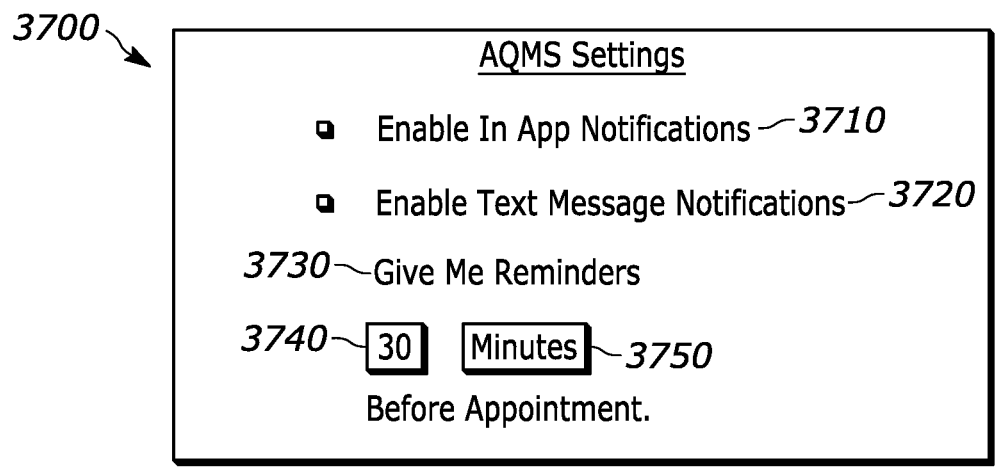
FIG. 37 shows an example settings GUI that may be presented on the display of an end-user's client device to configure one or more settings of the device/app/AQMS to operate consistent with present principles.

Now in reference to FIG. 37, another example GUI 3700 is shown. The GUI 3700 may be presented through an AQMS app executing at an end-user's device. The GUI 3700 may be presented to set or enable one or more settings of the end-user's AQMS app as will be used for booking arrivals at LPOEs. As such, the GUI 3700 may be navigated to through a device or app menu, for example.

As shown in FIG. 37, the GUI 3700 may include an option 3710 that may be selected to set or configure the device/app to undertake present principles, including presenting in-app notifications such as banner and lock screen notifications of arrival reminders. The GUI 3700 may also include an option 3720 to enable text message notifications so that SMS or MMS-based text message notifications may additionally or alternatively be provided.

If desired, the GUI 3700 may also include a setting 3730 at which the end-user can specify a threshold amount of time before a scheduled arrival time at which arrival reminders are to be presented. Thus, a number entry box 3740 and time increment drop-down menu 3745 may be presented for the end-user to establish this threshold amount of time, which in the present instance has been set to thirty minutes prior.

Figure 38:
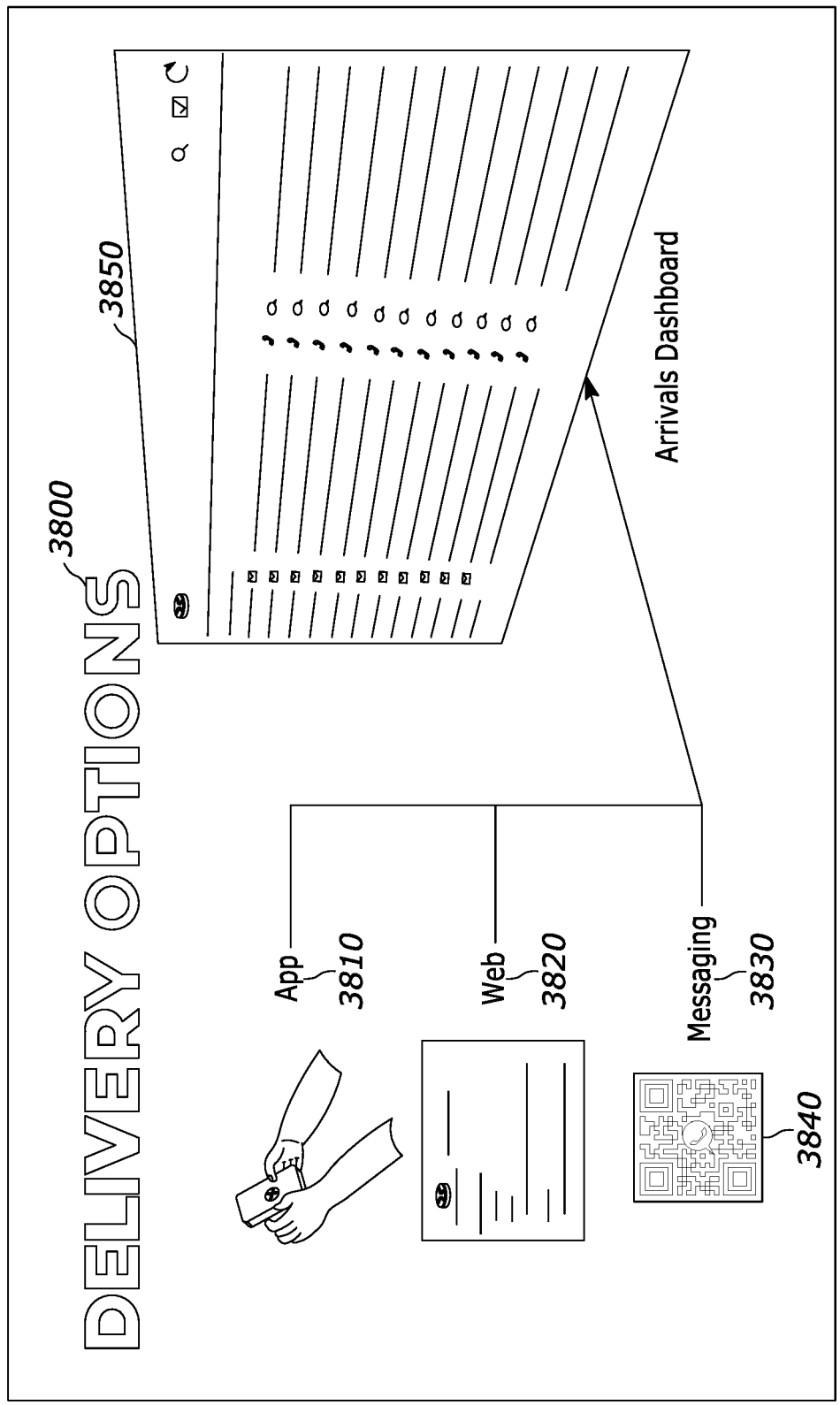
FIG. 38 shows a schematic of different AQMS-sourced arrival time delivery options consistent with present principles, along with an arrivals dashboard GUI that may be presented at a system administrator's (admin's) device consistent with present principles.

Now in reference to FIG. 38, a schematic of present principles is shown. Delivery options 3800 are shown for providing notifications indicating respective times at which respective users of the AQMS system are to queue for a port of entry at one or more respective entry lanes. As shown, the delivery options include a dedicated app 3810, respective instances/copies of which may be stored and executed at each user's own client device. A web-based portal/user interface 3820 may also be used by each user, as may SMS-based and/or MMS-based text messaging instances 3830. Note here that one of the text messages send to the end-user might include a quick response (QR) code 3840 or other code (e.g., bar code, bit code, etc.) that may be presented on the user's smartphone and then scanned/read by a camera at an entry kiosk as described above to grant that user access to the user's designated lane at the user's designated arrival time.

FIG. 38 also shows that an arrivals dashboard 3850 may be presented to the LPOE government officials at their own client device(s) and/or to other system administrators, where the dashboard 3850 may include a GUI as shown with respective columns for data access and viewing by the officials/admins. Those columns might include traveler category, LPOE location, traveler name, traveler language, respective call and text message selectors that may be selectable to call or message the respective traveler, scheduled arrival date and time, and WS number (phone number for WhatsApp messaging service). Another column might also be included for device ID/RFID ID from each user's RFID transponder on their vehicle.

Figure 39:
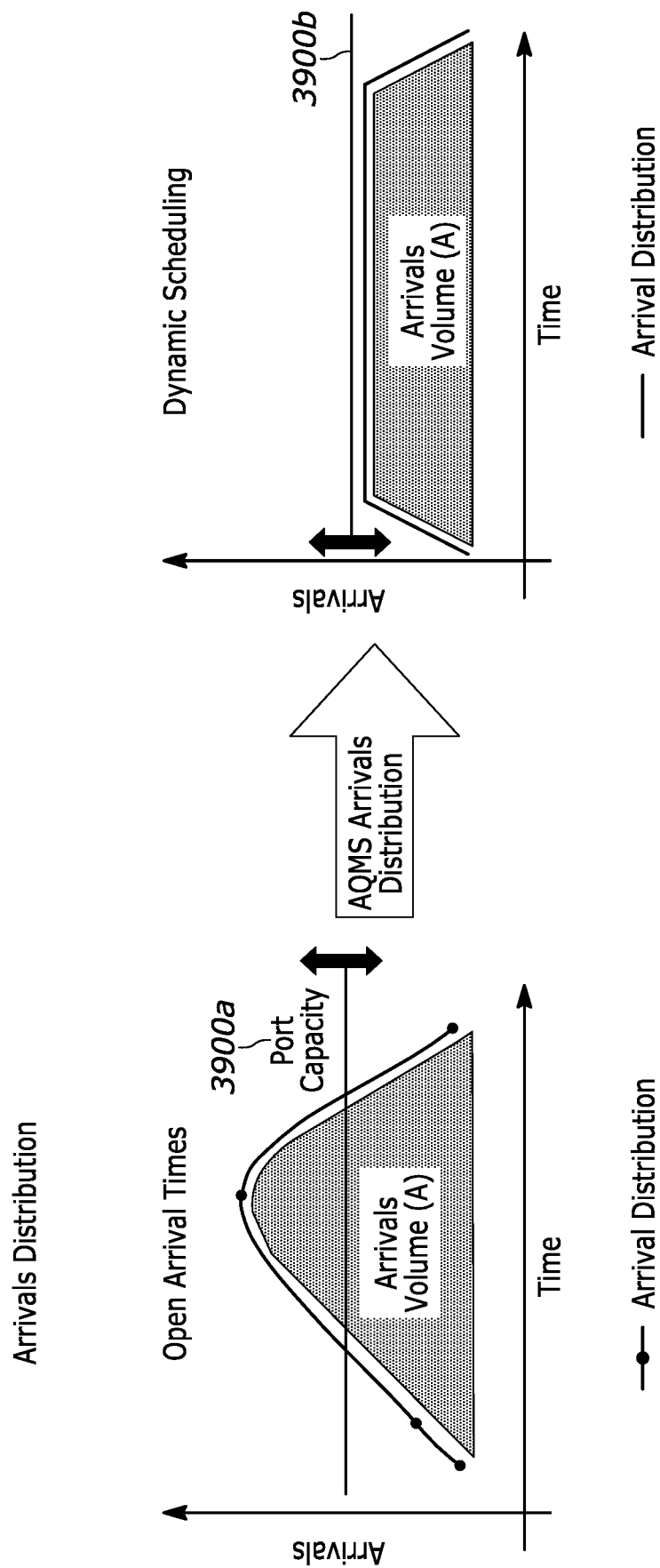
FIG. 39 shows a schematic further illustrating arrivals distribution consistent with present principles.

Turning to FIG. 39, a schematic that further illustrates arrivals distribution is shown. The left side of this figure demonstrates arrivals volume (A) that might occur absent present principles, where arrivals increase along the Y axis as time increases along the X axis and with it being noted that the arrivals volume on the left exceeds the port capacity 3900a and therefore processing times lead to bad outcomes and frustrated travelers.

The right side of FIG. 39 shows that by using AQMS arrivals distribution consistent with present principles (using dynamic scheduling), the arrivals volume (A) stays relatively flat and does not exceed the port capacity 3900b.

Based on the foregoing description, it may thus be appreciated that in one aspect, the AQMS may transmit a first notification to a first device, where the first notification may indicate a first time at which a first user of the first device is to queue for a port of entry. The AQMS may also receive input from a sensor monitoring lane traffic for at least a first entry lane at the port of entry and, based on the input, determine a second time at which a second user of a second device is to queue for the port of entry. The AQMS may also, based on the determination of the second time, transmit a second notification to the second device, where the second notification indicates a second time at which the second user is to queue for the port of entry. The AQMS may present the first notification at the first device by controlling a first instance of an application (app) as executing at the first device, and present the second notification at the second device by controlling a second instance of the app as executing at the second device.

The AQMS may also execute one or more functions as described above to maintain at least a threshold minimum number of vehicles in a queue of the first entry lane, where the threshold minimum number is greater than one. This might be accomplished by opening up time slots as traffic flows permit, as described above, so that lane queues may be optimized and balanced (e.g., so that some lanes do not become unduly long while other lanes are unoccupied). Still, the AQMS may also execute one or more functions as described above to keep the queue for each entry lane from exceeding a target maximum number of vehicles for the queue of the respective entry lane.

The AQMS might also use a Smartlane bot consistent with present principles (e.g., for SMS text messaging-based instances, web portal chat instances, dedicated app chat instances, etc.). The bot might use a large language model (LLM) to help with processing and responses, if desired.

Thus, a user might text "Smartlane" to a predetermined telephone number, and then be prompted to choose the user's preferred language. The user may then select the preferred language for the bot to set itself accordingly so that future outputs are presented to the user according to the user's language selection. The AQMS bot may then prompt the user to type the user's name, email address, and phone number. The user may provide that data in response. The user may then be prompted to select an arrival type (scheduled arrival with desired arrival date and time, or last-minute arrival) and the user may provide a desired response. The user might then be prompted to select the user's traveler class and respond with the class (e.g., Ready lane). The bot might then indicate something like "We have a 20-minute window available in 1 hour at a particular LPOE, do you want to reserve?" (or might indicate other language to schedule a future arrival per the user inputs). The user might respond in the affirmative for the bot to then confirm the scheduled arrival and arrival details. The bot might send another chat message such as "You're ready to go, arrive at checkpoint within your time window" with a map hyperlink to the POE and/or particular entry lane to which the user has been assigned.

As also mentioned above, the AQMS may establish arrival rates emulating flow rates, with remaining capacity being allocated for last-minute reservations. Thus, some capacity may be saved as a buffer to prevent exceeding the target maximum number of vehicles and then allocated for last-minute reservations when appropriate. The AQMS may thus optimize flow performance while minimizing wait time, optimizing traffic flow in the process through its dynamic batch-maker. Lane performance data for different lane classes may also be used to control queue length.

Providing more detail on determining arrival times for a given user, note that this may include determining arrival times based on existing bookings for the same time as the time span that the user is requesting to book for arrival (e.g., to see if additional AQMS lane capacity exists to book the user during that time/span). Additionally, if an immediate arrival is being requested, this may also include determining arrival times based on current flow rate/congestion as indicated via lane sensors as well as existing bookings for the current time (or immediate future time) that the user would arrive to ascertain if less than the target maximum number of vehicles exists for the queue of any available entry lane (to thus accommodate an immediate arrival via AQMS).

Thus, fuzzy logic may be executed using principles set forth herein to determine the arrival time(s) for the user.

Additionally or alternatively, an artificial intelligence-based model may be used to determine as much. For example, the model may include one or more neural networks (e.g., that include an input layer, an output/activation layer, and multiple hidden layers in between that are configured and weighted to make inferences about an appropriate output). The model may therefore include, as examples, one or more recurrent neural networks, residual neural networks, and even deep reinforcement learning neural networks. The model may be trained using one or more data sets of different inputs such as current or anticipated traffic flow rate, existing bookings, desired minimum number of vehicles for a queue, additional lane capacity less than the target maximum, etc. The one or more data sets may also include respective ground truth outputs for each input/input set, where the ground truth outputs might be labeled as requested booking acceptable or requested booking not able to be accommodated. The model may then be trained using various machine learning techniques, including reinforcement learning and supervised learning as examples. The trained model may then be deployed, with deployment inputs being similar to the training inputs described above and the deployment outputs being similar to the ground truth training outputs mentioned above. Thus, during deployment the model may output an affirmative response (requested booking acceptable) or negative response (requested booking cannot be accommodated) for output to the user.

Before concluding, it is to be understood that although a software application for undertaking present principles may be vended with a device, present principles apply in instances where such an application is downloaded from a server to a device over a network such as the Internet. Furthermore, present principles apply in instances where such an application is included on a computer readable storage medium that is vended and/or provided by itself, where the computer readable storage medium is not a transitory signal and/or a signal per se.

It may now be appreciated that present principles provide, among other technical improvements, improved computer-based user interfaces that increase the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein.

What is claimed is:

1. An apparatus, comprising:
a processor assembly; and
storage accessible to the processor assembly and comprising instructions executable by the processor assembly to:
execute, at a server, an active queue management system (AQMS) to dynamically schedule vehicle arrivals at a cross-border land port of entry (LPOE) according to a capacity factor such that, based on the capacity factor, vehicle arrivals are scheduled for respective arrival timeslots to maintain a total number of vehicles in a respective lane queue that is both above a threshold minimum number of vehicles and below a target maximum number of vehicles;
transmit, via the server, a first notification to a first client device, the first notification indicating a first time at which a first user of the first client device is to arrive at the cross-border LPOE;
receive, at the server, input from a sensor monitoring lane traffic for at least a first entry lane at the cross-border LPOE;
based on the input and the capacity factor, determine, at the server, a second time at which a second user of a second client device is to arrive at the cross-border LPOE;
based on the determination of the second time, transmit, via the server, a second notification to the second client device, the second notification indicating a second time at which the second user is to arrive at the cross-border LPOE;
present, at a third client device associated with a government entity system administrator, a graphical user interface (GUI), the GUI comprising respective entries for respective scheduled vehicle arrivals at the cross-border LPOE, the respective entries on the GUI being associated with respective travelers, the respective entries on the GUI each comprising: a first indication of traveler category, a second indication of traveler name, a third indication of scheduled arrival time, and a contact selector that is selectable to contact the respective traveler; and,
at the server and based on the capacity factor, make additional managed arrivals available for one or more of:
a next arrival batch for the respective lane queue so that previously unscheduled arrivals can be scheduled for the next arrival batch; and/or
a current arrival batch for the respective lane queue so that previously unscheduled arrivals can be scheduled for immediate arrival, the current arrival batch associated with a current time of day.

2. The apparatus of claim 1, wherein the instructions are executable to: present the first notification at the first client device by controlling a first instance of an application (app) executing at the first client device; and
present the second notification at the second client device by controlling a second instance of the app executing at the second client device.

3. The apparatus of claim 1, wherein the capacity factor is in the range 0 to 0.99.

4. The apparatus of claim 1, wherein the capacity factor is in the range 0.8 to 0.95.

5. The apparatus of claim 1, wherein the threshold minimum number of vehicles is greater than one.

6. The apparatus of claim 1, wherein the threshold minimum number of vehicles is set at the third client device associated with the government entity system administrator.

7. The apparatus of claim 1, wherein the capacity factor is configured to compensate for flow rate changes at the respective lane queue while still maintaining the total number of vehicles in the respective lane queue below the target maximum number of vehicles.

8. The apparatus of claim 1, wherein the instructions are executable to: at the server and based on the capacity factor, make additional managed arrivals available for the next arrival batch for the respective lane queue so that previously unscheduled arrivals can be scheduled for the next arrival batch.

9. The apparatus of claim 1, wherein the instructions are executable to: at the server and based on the capacity factor, make additional managed arrivals available for the current arrival batch for the respective lane queue so that previously unscheduled arrivals can be scheduled for immediate arrival, the current arrival batch associated with the current time of day.

10. The apparatus of claim 1, wherein the capacity factor is a first capacity factor associated with the current arrival batch, and wherein the instructions are executable to: based on a current level of saturation in the respective lane queue, determine a second capacity factor for the next arrival batch, the second capacity factor being less than the first capacity factor;

and apply the second capacity factor when managing vehicle arrivals for the next arrival batch.

11. The apparatus of claim 1, wherein the apparatus comprises each of: the server, the first client device, the second client device, and the third client device.

12. The apparatus of claim 1, wherein the respective entries on the GUI each comprise one or more of: a fourth indication of LPOE location, a fifth indication of traveler language, and a sixth indication of scheduled arrival date.

13. The apparatus of claim 1, wherein the contact selector is established by one or more of: a call selector that is selectable to call the respective traveler, a text message selector that is selectable to text message the respective traveler.

14. A method, comprising:
executing an electronic active queue management system (AQMS) to dynamically schedule vehicle arrivals at a cross-border land port of entry (LPOE) according to a capacity factor such that, based on the capacity factor, vehicle arrivals are scheduled for respective arrival timeslots to maintain a total number of vehicles in a respective lane queue that is both above a threshold minimum number of vehicles and below a target maximum number of vehicles, the capacity factor configured to compensate for flow rate changes at the respective lane queue while still maintaining the total number of vehicles in the respective lane queue below the target maximum number of vehicles;
receiving input from a sensor monitoring lane traffic for one or more entry lanes at the cross-border LPOE;
based on the input and the capacity factor, determining a time at which a user of a first client device is to arrive at the cross-border LPOE;
based on the determining of the time, transmitting a notification to the first client device, the notification indicating a time at which the user is to arrive at the cross-border LPOE; and
presenting, at a second client device associated with a government entity system administrator, a graphical user interface (GUI), the GUI comprising respective entries for respective scheduled vehicle arrivals at the cross-border LPOE, the respective entries on the GUI being associated with respective travelers, the respective entries on the GUI each comprising: a first indication of traveler category, a second indication of traveler name, a third indication of scheduled arrival time, and a contact selector that is selectable to contact the respective traveler from the second client device.

15. The method of claim 14, comprising one or more of:
based on the capacity factor, making additional managed arrivals available for a current arrival batch for the respective lane queue so that previously unscheduled arrivals can be scheduled for immediate arrival, the current arrival batch associated with a current time of day; and/or
based on the capacity factor, making additional managed arrivals available for a next arrival batch for the respective lane queue so that previously unscheduled arrivals can be scheduled for the next arrival batch.

16. The method of claim 14, wherein the capacity factor is a first capacity factor associated with a current arrival batch, and wherein the method comprises: based on a current level of saturation in the respective lane queue, determining a second capacity factor for a next arrival batch, the second capacity factor being less than the first capacity factor;
and applying the second capacity factor when managing vehicle arrivals for the next arrival batch.

17. An apparatus, comprising:
at least one computer readable storage medium (CRSM) that is not a transitory signal, the at least one CRSM comprising instructions executable by a processor assembly to:
execute an electronic active queue management system (AQMS) to dynamically schedule vehicle arrivals at a cross-border land port of entry (LPOE) according to a capacity factor such that, based on the capacity factor, vehicle arrivals are scheduled for respective arrival timeslots to maintain a total number of vehicles in a queue for a first lane that is both above a threshold minimum number of vehicles for the first lane and below a target maximum number of vehicles for the first lane, the capacity factor configured to compensate for flow rate changes at the first lane while still maintaining the total number of vehicles in the first lane below the target maximum number of vehicles;
receive input from a sensor monitoring lane traffic for the first lane at the cross-border LPOE;
based on the input and the capacity factor, determine a time at which a user of a first client device is to arrive at the first lane;
based on the determination of the time, transmit a notification to the first client device, the notification indicating a time at which the user is to arrive at the first lane, the notification indicating the first lane that the user is to use to go through the cross-border LPOE; and
present, at a second client device associated with a government entity system administrator, a graphical user interface (GUI), the GUI comprising respective entries for respective scheduled vehicle arrivals at the first lane of the cross-border LPOE, the respective entries on the GUI being associated with respective travelers, the respective entries on the GUI each comprising: a first indication of traveler category, a second indication of traveler name, a third indication of scheduled arrival time, and a contact selector that is selectable to contact the respective traveler from the second client device.

18. The apparatus of claim 17, wherein the instructions are executable to: responsive to determining that the total number of vehicles in the queue is increasing toward the target maximum number of vehicles, request the opening of an additional booth at the LPOE;
and responsive to determining that the total number of vehicles in the queue is decreasing toward the threshold minimum number of vehicles, close of at least one booth at the LPOE.

19. The apparatus of claim 17, wherein the instructions are executable to one or more of: based on the capacity factor, make additional managed arrivals available for a next arrival batch for the queue so that previously unscheduled arrivals can be scheduled for the next arrival batch;
and/or based on the capacity factor, make additional managed arrivals available for a current arrival batch for the queue so that previously unscheduled arrivals can be scheduled for immediate arrival, the current arrival batch associated with a current time of day.

20. The apparatus of claim 17, wherein the capacity factor is a first capacity factor associated with a current arrival batch, and wherein the instructions are executable to: based on a current level of saturation in the queue, determine a second capacity factor for a next arrival batch, the second capacity factor being less than the first capacity factor;

and apply the second capacity factor when managing vehicle arrivals for the next arrival batch.

21. An apparatus, comprising:

a processor assembly; and storage accessible to the processor assembly and comprising instructions executable by the processor assembly to:

execute, at a server, an active queue management system (AQMS) to dynamically schedule vehicle arrivals at a cross-border land port of entry (LPOE) according to a first capacity factor such that, based on the first capacity factor, vehicle arrivals are scheduled for respective arrival timeslots to maintain a total number of vehicles in a respective lane queue that is both above a threshold minimum number of vehicles and below a target maximum number of vehicles, the first capacity factor associated a current arrival batch for the respective lane queue;

transmit, via the server, a first notification to a first client device, the first notification indicating a first time at which a first user of the first client device is to arrive at the cross-border LPOE;

receive, at the server, input from a sensor monitoring lane traffic for at least a first entry lane at the cross-border LPOE;

based on the input and the first capacity factor, determine, at the server, a second time at which a second user of a second client device is to arrive at the cross-border LPOE;

based on the determination of the second time, transmit, via the server, a second notification to the second client device, the second notification indicating a second time at which the second user is to arrive at the cross-border LPOE;

present, at a third client device associated with a government entity system administrator, a graphical user interface (GUI), the GUI comprising respective entries for respective scheduled vehicle arrivals at the cross-border LPOE, the respective entries on the GUI being associated with respective travelers, the respective entries on the GUI each comprising: a first indication of traveler category, a second indication of traveler name, a third indication of scheduled arrival time, and a contact selector that is selectable to contact the respective traveler; and based on a current level of saturation in the respective lane queue, determine a second capacity factor for a next arrival batch for the respective lane queue, the second capacity factor being less than the first capacity factor; and apply the second capacity factor when managing vehicle arrivals for the next arrival batch.

\* \* \* \* \*